US012693684B2

(12) United States Patent
Keen et al.

(10) Patent No.: US 12,693,684 B2
(45) Date of Patent: Jul. 28, 2026

(54) AUTOMATED TRANSFER OF CONTAINERS FOR MULTIMODAL TRANSPORTATION

(71) Applicant: International Business Machines Corporation, Armonk, NY (US)

(72) Inventors: Martin G. Keen, Cary, NC (US); Sarbajit Kumar Rakshit, Kolkata (IN); Jeremy R. Fox, Georgetown, TX (US); Tushar Agrawal, West Fargo, ND (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 19/017,537

(22) Filed: Jan. 11, 2025

(65) Prior Publication Data

US 2026/0202860 A1 Jul. 16, 2026

(51) Int. Cl.
*G05D 1/667* (2024.01)
*G05D 1/646* (2024.01)
(Continued)

(52) U.S. Cl.
CPC ............. *G05D 1/667* (2024.01); *G05D 1/646* (2024.01); *G05D 1/69* (2024.01); *G05D 1/86* (2024.01);
(Continued)

(58) Field of Classification Search
CPC .......... G05D 1/667; G05D 1/646; G05D 1/69; G05D 1/86; G05D 2105/20; G05D 2107/70; G06F 21/30; G06Q 10/087
See application file for complete search history.

(56) References Cited

U.S. PATENT DOCUMENTS

| | | | | |
|---|---|---|---|---|
| 11,167,922 | B2 * | 11/2021 | Lindbo | .................... E04B 1/94 |
| 2020/0122834 | A1 * | 4/2020 | Daw Perez | ............ B64D 9/003 |

(Continued)

FOREIGN PATENT DOCUMENTS

| | | |
|---|---|---|
| CN | 215325714 U | 12/2021 |
| GB | 2613320 B | 11/2023 |

OTHER PUBLICATIONS

"A swarm of luggage transport robots moving through an airport", IFAC PapersOnLine, 2022, pp. 102-107.

(Continued)

*Primary Examiner* — Navid Z. Mehdizadeh
*Assistant Examiner* — Shelley Marie Osterhout
(74) *Attorney, Agent, or Firm* — CHIP LAW GROUP

(57) ABSTRACT

Automated transfer of containers for multimodal transportation includes obtaining first attribute data of a transportation vehicle, second attribute data of a container on a carrier vehicle, first position data of the transportation vehicle, and second position data of the carrier vehicle. The transportation vehicle is authenticated based on the first attribute data and the second attribute data. A transfer trajectory associated with the container is generated based on the first position data and the second position data. An electromechanical platform is controlled to movably extend between the carrier vehicle and the transportation vehicle, creating a transfer path for the container. A set of mini vehicles is identified based on the second attribute data of the container such as container's physical weight and size, and each mini vehicle is controlled to move the container along the transfer path, based on the transfer trajectory.

20 Claims, 18 Drawing Sheets

(51) Int. Cl.

| | |
|---|---|
| *G05D 1/69* | (2024.01) |
| *G05D 1/86* | (2024.01) |
| *G05D 105/20* | (2024.01) |
| *G05D 107/70* | (2024.01) |
| *G06F 21/30* | (2013.01) |
| *G06Q 10/087* | (2023.01) |

(52) U.S. Cl.
     CPC ........... *G06F 21/30* (2013.01); *G06Q 10/087*
          (2013.01); *G05D 2105/20* (2024.01); *G05D*
                                   *2107/70* (2024.01)

(56) References Cited

U.S. PATENT DOCUMENTS

| | | | |
|---|---|---|---|
| 2021/0284447 A1* | 9/2021 | Luckinbill | ............... B25J 9/162 |
| 2023/0072997 A1 | 3/2023 | Chu et al. | |
| 2023/0083532 A1 | 3/2023 | Sibley | |
| 2023/0137578 A1 | 5/2023 | Cella et al. | |

OTHER PUBLICATIONS

IBM. "What is supply chain optimization?", Business operations, Jul. 19, 2021, 11 pages.

Lee et al. "Advanced Container Transportation Equipment using Transfer Robot and Alignment System", IEEE Symposium on Industrial Electronics and Applications, 2011, 6 pages.

Luckinbill Glenn. "Swarm Robots to Increase Container Terminal Throughput", Futuris—Creating the supply chains of the future, Aug. 7, 2017, 4 pages.

Rodger Declan. "Optimizing shipping logistics in a time of change", IBM Planning Analytics, Sep. 8, 2022, 9 pages.

Tarapore et al. "Sparse Robot Swarms: Moving Swarms to Real-World Applications", Frontier in Robotics and AI, Jul. 2, 2020, 9 pages.

Youtube. "How the 60k Super High 40 Loads a Container", retrieved from web https://www.quickloadz.com/technology/, dated Mar. 11, 2025, 5 pages.

* cited by examiner

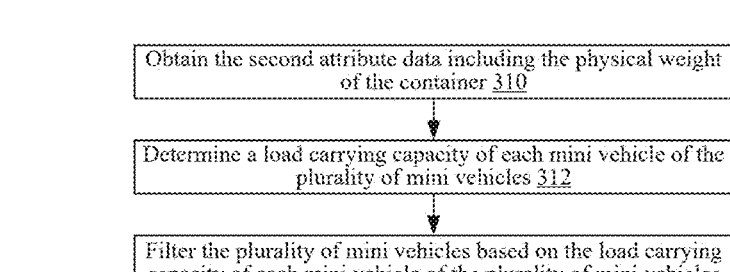

Obtain the second attribute data including the physical weight of the container 310

Determine a load carrying capacity of each mini vehicle of the plurality of mini vehicles 312

Filter the plurality of mini vehicles based on the load carrying capacity of each mini vehicle of the plurality of mini vehicles and the physical weight of the container 314

Output a set of filtered mini vehicles 316

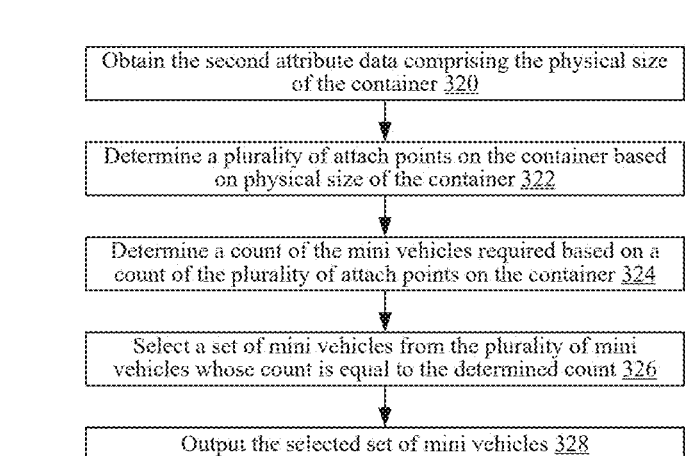

Obtain the second attribute data comprising the physical size of the container 320

Determine a plurality of attach points on the container based on physical size of the container 322

Determine a count of the mini vehicles required based on a count of the plurality of attach points on the container 324

Select a set of mini vehicles from the plurality of mini vehicles whose count is equal to the determined count 326

Output the selected set of mini vehicles 328

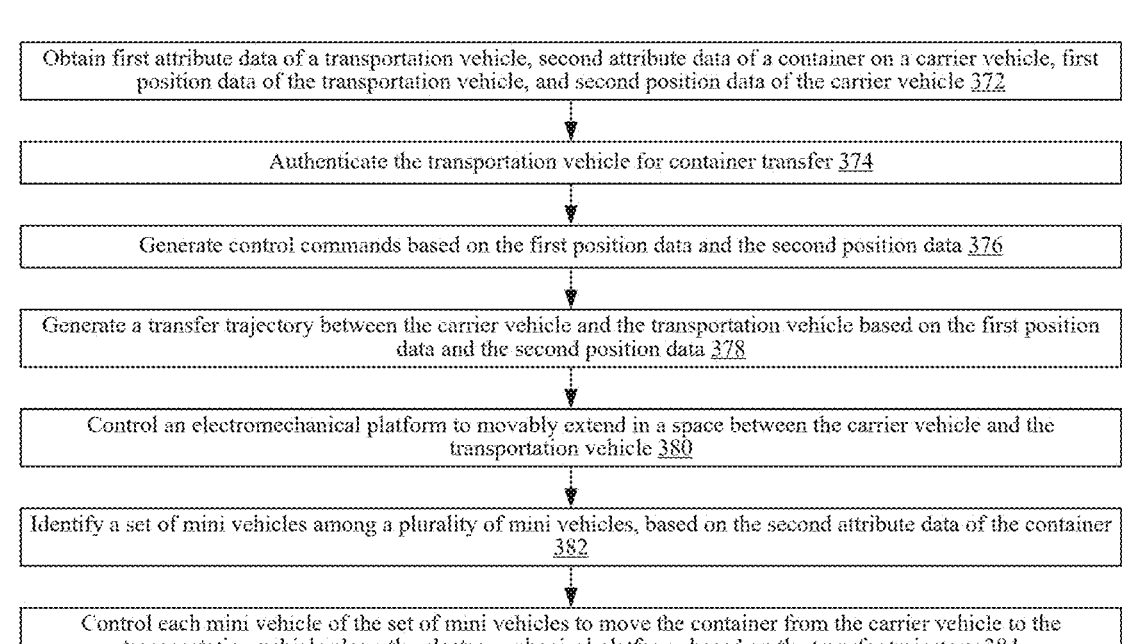

Obtain first attribute data of a transportation vehicle, second attribute data of a container on a carrier vehicle, first position data of the transportation vehicle, and second position data of the carrier vehicle 372

Authenticate the transportation vehicle for container transfer 374

Generate control commands based on the first position data and the second position data 376

Generate a transfer trajectory between the carrier vehicle and the transportation vehicle based on the first position data and the second position data 378

Control an electromechanical platform to movably extend in a space between the carrier vehicle and the transportation vehicle 380

Identify a set of mini vehicles among a plurality of mini vehicles, based on the second attribute data of the container 382

Control each mini vehicle of the set of mini vehicles to move the container from the carrier vehicle to the transportation vehicle along the electromechanical platform, based on the transfer trajectory 384

AUTOMATED TRANSFER OF CONTAINERS FOR MULTIMODAL TRANSPORTATION

BACKGROUND

The disclosure relates to containers and, more particularly, to the transfer of containers.

In modern logistics and supply chain management, multimodal transportation where goods are moved using multiple modes of transport such as rail, road, air, and water plays a crucial role in connecting global regions. The seamless transfer of goods across these modes is essential for maintaining operational efficiency, reducing transit times, and optimizing costs. As industries strive to meet the increasing demand for reliable and scalable logistics solutions, traditional container handling methods impose substantial technical and operational challenges.

SUMMARY

In various embodiments of the disclosure, a computer-implemented method for automated transfer of containers for multimodal transportation is described. The computer-implemented method includes obtaining, by a computer, first attribute data of a transportation vehicle, second attribute data of a container on a carrier vehicle, first position data of the transportation vehicle, and second position data of the carrier vehicle. The computer-implemented method further includes authenticating, by the computer, the transportation vehicle for container transfer of the container. The authentication of the transportation vehicle is based on the first attribute data and the second attribute data. The computer-implemented method further includes generating, by the computer, a transfer trajectory between the carrier vehicle and the transportation vehicle, based on the first position data and the second position data. The transfer trajectory is associated with the container. The computer-implemented method further includes controlling, by the computer, an electromechanical platform to movably extend in a space between the carrier vehicle and the transportation vehicle to create a transfer path for the container. The computer-implemented method further includes identifying, by the computer, a set of mini vehicles from a plurality of mini vehicles, based on the second attribute data of the container. The computer-implemented method further includes controlling, by the computer, each mini vehicle of the set of mini vehicles to move the container from the carrier vehicle to the transportation vehicle along the electromechanical platform, based on the transfer trajectory.

In various embodiments of the disclosure, a computer system for automated transfer of containers for multimodal transportation is described. The computer system includes a processor set, one or more computer-readable storage media, and program instructions stored on the one or more computer-readable storage media. The program instructions are executable by the processor set to cause the processor set to obtain first attribute data of the transportation vehicle, second attribute data of a container on the carrier vehicle, first position data of the transportation vehicle, and second position data of the carrier vehicle. The program instructions are executable by the processor set to further cause the processor set to authenticate the transportation vehicle for container transfer of the container. The authentication is based on the first attribute data and the second attribute data. The program instructions are executable by the processor set to further cause the processor set to generate a transfer trajectory between the carrier vehicle and the transportation vehicle, based on the first position data and the second position data. The transfer trajectory is associated with the container. The program instructions are executable by the processor set to further cause the processor set to control an electromechanical platform to movably extend in a space between the carrier vehicle and the transportation vehicle to create a transfer path for the container. The program instructions are executable by the processor set to further cause the processor set to identify a set of mini vehicles from the plurality of mini vehicles, based on the second attribute data of the container. The program instructions are executable by the processor set to further cause the processor set to control each mini vehicle of the set of mini vehicles to move the container from the carrier vehicle to the transportation vehicle along the electromechanical platform, based on the transfer trajectory.

In various embodiments of the disclosure, a computer program product for automated transfer of containers for multimodal transportation is described. The computer program product includes one or more computer-readable storage media and program instructions stored on the one or more computer-readable storage media to perform operations including obtaining first attribute data of the transportation vehicle, second attribute data of the container, first position data of the transportation vehicle, and second position data of the carrier vehicle. The operations further include authenticating the transportation vehicle for the automated transfer of the container. The authentication of the transportation vehicle is based on the first attribute data and the second attribute data. The operations further include generating a transfer trajectory between the carrier vehicle and the transportation vehicle, based on the first position data and the second position data. The transfer trajectory is associated with the container. The operations further include controlling an electromechanical platform to movably extend in a space between the carrier vehicle and the transportation vehicle to create a transfer path for the container. The operations further include identifying a set of mini vehicles from a plurality of mini vehicles, based on the second attribute data of the container. The operations further include controlling each mini vehicle of the set of mini vehicles to move the container from the carrier vehicle to the transportation vehicle along the electromechanical platform, based on the transfer trajectory.

Additional technical features and benefits are realized through the techniques of the disclosure. Embodiments and aspects of the disclosure are described in detail herein and are considered a part of the claimed subject matter. For a better understanding, refer to the detailed description and to the drawings.

BRIEF DESCRIPTION OF DRAWINGS

The following description will provide details of preferred embodiments with reference to the following figures where:

FIG. 2E is a diagram that illustrates a flowchart of a container weight-based mini vehicle selection process of the framework of FIG. 2B, in accordance with an embodiment of the disclosure;

FIG. 2F is a diagram that illustrates a flowchart of a container size-based mini vehicle selection process of the framework of FIG. 2B, in accordance with an embodiment of the disclosure;

FIG. 3B is a diagram that illustrates a flowchart of an exemplary method for the automated transfer of containers for multimodal transportation, in accordance with an embodiment of the disclosure;

FIG. 4A is a diagram that illustrates an electromechanical platform movably coupled with the base of a carrier vehicle, in accordance with an embodiment of the disclosure;

FIG. 5 is a diagram that illustrates a perspective view of a mini vehicle used for the automated transfer of containers, in accordance with an embodiment of the disclosure;

DETAILED DESCRIPTION

Figure 1:
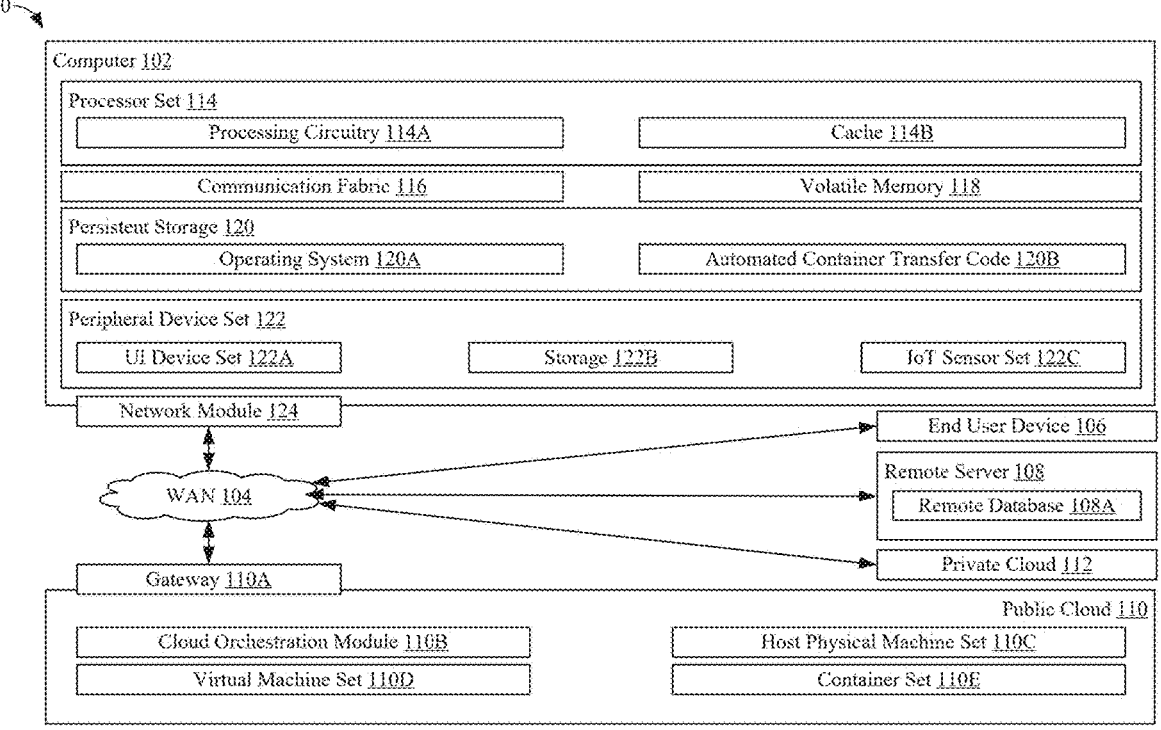
FIG. 1 is a diagram that illustrates a computing environment for the automated transfer of containers for multimodal transportation, in accordance with an embodiment of the disclosure.

Conventional systems for intermodal transfers often depend on infrastructure-heavy setups, such as cranes and specialized terminals, to move containers between carriers like trains, trucks, or ships. These setups, while effective in controlled environments, may lead to inefficiencies in dynamic or high-demand scenarios. Additionally, these methods often incur high capital and operational costs, including the need for skilled labor, regular maintenance of large equipment, and space-intensive facilities.

The traditional container transfer systems rely heavily on cranes and specialized terminals for intermodal transportation, resulting in inefficiencies, high operational costs, and limited flexibility. These systems are often constrained by physical infrastructure and require significant manual intervention, leading to delays and increased logistics expenses. As supply chain operations grow more complex, the reliance on static transfer systems creates bottlenecks, reducing the overall efficiency of multimodal transport networks. These limitations hinder the seamless movement of containers between transportation modes, such as trucks, trains, and ships, adversely affecting cost-efficiency and scalability.

Robotic and automated transfer technologies address these challenges but face significant barriers in achieving high levels of synchronization, precision, and scalability. Current solutions often involve extensive human oversight or static pre-configuration, which reduces the flexibility to adapt to real-time changes in container attributes or transport vehicle alignment. Additionally, many systems lack integrated monitoring, resource allocation, and anomaly detection measures, which are required for maintaining the reliability and accuracy of container transfers in dynamic environments. These deficiencies lead to inefficiencies, missed optimization opportunities, and potential risks to cargo integrity during the transfer process.

To address these issues, there is a need for a system that automates and streamlines container transfers across multiple modes of transport while minimizing infrastructure requirements and operational costs. Such a system integrates advanced robotic control, dynamic resource allocation, and real-time monitoring to ensure precision, reliability, and scalability. Furthermore, the system incorporates intelligent algorithms to synchronize movements, allocate resources, and identify anomalies, enabling seamless and efficient container transfers without requiring specialized terminals or extensive manual intervention. Various example embodiments of this disclosure exploit advanced technologies, including robotics and machine learning in a cohesive and adaptive system that combines precision, automation, and intelligent resource management. The systems and methods disclosed herein provide a transformative solution having the potential to streamline intermodal container handling in a scalable manner with lower energy consumption.

The disclosure provides an automated container transfer system designed to optimize intermodal transportation by integrating robotic platforms, swarm intelligence, and advanced synchronization algorithms. This system facilitates container movement between carrier vehicles, such as trains, and transportation vehicles, such as trucks, using an electromechanical platform and a swarm of mini vehicles. By dynamically allocating mini vehicles based on container attributes, the system ensures efficient and precise handling of containers of varying sizes, weights, and configurations. The use of reinforcement learning and swarm intelligence enables continuous improvement and adaptability to real-time changes in the transfer environment.

Core components of the system include a computerized system equipped with advanced processors, memory, and storage to manage data flow and execute optimization algorithms. The system utilizes position data and attribute data of various participating entities in the multimodal transportation, as well as trajectory planning to generate optimized transfer paths. Mini vehicles equipped with dynamic alignment systems and techniques interact with an electromechanical platform to facilitate container movement. Real-time monitoring and feedback mechanisms ensure the system operates with high precision, identifying and addressing anomalies proactively. Blockchain technology may be employed to log and verify container transfers, enhancing security and traceability.

This disclosure revolutionizes container transfer by eliminating the need for traditional cranes and specialized terminals, thereby reducing operational costs and infrastructure dependencies. Various embodiments of the disclosure provide mechanisms for parallel handling of multiple containers, thereby leading to reduced waiting time for transportation fleets, faster turnaround in supply chain management, as well as a coordinated approach for secured management of entities within the multimodal transportation network. By automating resource allocation and synchronization, the system improves efficiency, scalability, and reliability in multimodal transport networks. Real-time adaptability and anomaly detection further enhance its robustness, making it a versatile solution for modern supply chain challenges. The disclosed system supports seamless integration into existing logistics workflows, enabling cost-effective and efficient container transfer across transportation modes.

In various embodiments of the disclosure, a computer-implemented method for automated transfer of containers for multimodal transportation is described. The computer-implemented method includes obtaining, by a computer, first attribute data of a transportation vehicle, second attribute data of a container on a carrier vehicle, first position data of the transportation vehicle, and second position data of the carrier vehicle. The computer-implemented method further includes authenticating, by the computer, the transportation vehicle for container transfer of the container. The authentication of the transportation vehicle is based on the first attribute data and the second attribute data. The computer-implemented method further includes generating, by the computer, a transfer trajectory between the carrier vehicle and the transportation vehicle, based on the first position data and the second position data. The transfer trajectory is associated with the container. The computer-implemented method further includes controlling, by the computer, an electromechanical platform to movably extend in a space between the carrier vehicle and the transportation vehicle to create a transfer path for the container. The computer-implemented method further includes identifying, by the computer, a set of mini vehicles from a plurality of mini vehicles, based on the second attribute data of the container. The computer-implemented method further includes controlling, by the computer, each mini vehicle of the set of mini vehicles to move the container from the carrier vehicle to the transportation vehicle along the electromechanical platform, based on the transfer trajectory.

In various embodiments of the disclosure, the computer-implemented method further includes generating, by the computer, control commands based on the first position data and the second position data. The control commands define maneuvers for at least one of the transportation vehicle or the carrier vehicle to align the transportation vehicle with the container.

In various embodiments of the disclosure, the second attribute data includes a physical size of the container. The identification of the set of mini vehicles from the plurality of mini vehicles further includes determining, by the computer, a plurality of attach points on the container and determining, by the computer, a count of the set of mini vehicles. The identification of the set of mini vehicles from the plurality of mini vehicles further includes determining of the plurality of attach points on the container is based on the physical size of the container. The determining of the count of the set of mini vehicles is based on a count of the plurality of attach points on the container.

In various embodiments of the disclosure, the controlling of each mini vehicle of the set of mini vehicles further includes controlling, by the computer, each mini vehicle of the set of mini vehicles to align with a corresponding attach point of the plurality of attach points on the container. The controlling of each mini vehicle of the set of mini vehicles further includes determining, by the computer, an individual trajectory for each mini vehicle of the set of mini vehicles based on the transfer trajectory. The corresponding attach point of the plurality of attach points on the container. The controlling of each mini vehicle of the set of mini vehicles further includes controlling, by the computer, a motion of each mini vehicle of the set of aligned mini vehicles based on a corresponding individual trajectory.

In various embodiments of the disclosure, the second attribute data includes a physical weight of the container. The identification of the set of mini vehicles from the plurality of mini vehicles further includes determining, by the computer, a load carrying capacity of each mini vehicle of the plurality of mini vehicles. The identification of the set of mini vehicles from the plurality of mini vehicles further includes filtering, by the computer, the plurality of mini vehicles and outputting, by the computer, a plurality of filtered mini vehicles as the set of mini vehicles for the container transfer. The filtering of the plurality of mini vehicles is based on the load carrying capacity of each mini vehicle of the plurality of mini vehicles and the physical weight of the container.

In various embodiments of the disclosure, the controlling of each mini vehicle of the set of mini vehicles is based on at least one state parameter of at least one mini vehicle of the set of mini vehicles. The at least one state parameter is associated with dynamics of the at least one mini vehicle of the set of mini vehicles.

In various embodiments of the disclosure, the computer-implemented method further includes generating, by the computer, a threshold condition associated with mobility of the at least one mini vehicle based on at least one physical attribute of the at least one mini vehicle and the second attribute data of the container. The computer-implemented method further includes detecting, by the computer, an anomaly associated with the mobility of the at least one mini vehicle based on the at least one state parameter violating the threshold condition.

In various embodiments of the disclosure, the computer-implemented method further includes generating, by the computer, transfer record data for the container based on movement of the container from the carrier vehicle to the transportation vehicle. The computer-implemented method further includes updating, by the computer, a transfer log database based on the transfer record data.

In various embodiments of the disclosure, the first attribute data is associated with at least one of a first physical dimension of the transportation vehicle or a first identifier of the transportation vehicle. The second attribute data is associated with at least one of a second physical dimension of the container or a second identifier of the container.

In various embodiments of the disclosure, a computer system for automated transfer of containers for multimodal transportation is described. The computer system includes a processor set, one or more computer-readable storage media, and program instructions stored on the one or more computer-readable storage media. The program instructions are executable by the processor set to cause the processor set to obtain first attribute data of the transportation vehicle, second attribute data of a container on the carrier vehicle, first position data of the transportation vehicle, and second position data of the carrier vehicle. The program instructions are executable by the processor set to further cause the processor set to authenticate the transportation vehicle for container transfer of the container. The authentication is based on the first attribute data and the second attribute data. The program instructions are executable by the processor set to further cause the processor set to generate a transfer trajectory between the carrier vehicle and the transportation vehicle, based on the first position data and the second position data. The transfer trajectory is associated with the container. The program instructions are executable by the processor set to further cause the processor set to control an electromechanical platform to movably extend in a space between the carrier vehicle and the transportation vehicle to create a transfer path for the container. The program instructions are executable by the processor set to further cause the processor set to identify a set of mini vehicles from the plurality of mini vehicles, based on the second attribute data of the container. The program instructions are executable by the processor set to further cause the processor set to control each mini vehicle of the set of mini vehicles to move the container from the carrier vehicle to the transportation vehicle along the electromechanical platform, based on the transfer trajectory.

In various embodiments of the disclosure, the program instructions further cause the processor set to generate control commands based on the first position data and the second position data. The control commands define maneuvers for at least one of the transportation vehicle or the carrier vehicle to align the transportation vehicle with the container.

In various embodiments of the disclosure, the second attribute data includes a physical size of the container. To identify the set of mini vehicles from the plurality of mini vehicles, the program instructions further cause the processor set to determine a plurality of attach points on the container, based on the physical size of the container. The program instructions further cause the processor set to determine a count of the set of mini vehicles based on a count of the plurality of attach points on the container.

In various embodiments of the disclosure, to control each mini vehicle of the set of mini vehicles, the program instructions further cause the processor set to control each mini vehicle of the set of mini vehicles to align with a corresponding attach point of the plurality of attach points on the container. The program instructions further cause the processor set to determine an individual trajectory for each mini vehicle of the set of mini vehicles based on the transfer trajectory and the corresponding attach point of the plurality of attach points on the container The program instructions further cause the processor set to control a motion of each mini vehicle of the set of aligned mini vehicles based on a corresponding individual trajectory.

In various embodiments of the disclosure, the second attribute data includes a physical weight of the container. To identify the set of mini vehicles from the plurality of mini vehicles, the program instructions further cause the processor set to determine a load carrying capacity of each mini vehicle of the plurality of mini vehicles. The program instructions further cause the processor set to filter the plurality of mini vehicles, based on the load carrying capacity of each mini vehicle of the plurality of mini vehicles and the physical weight of the container. The program instructions further cause the processor set to output the plurality of filtered mini vehicles as the set of mini vehicles for the container transfer.

In various embodiments of the disclosure, the program instructions further cause the processor set to control, each mini vehicle of the set of mini vehicles to move the container along the electromechanical platform, based on at least one state parameter of at least one mini vehicle of the set of mini vehicles. The at least one state parameter is associated with dynamics of the at least one mini vehicle of the set of mini vehicles.

In various embodiments of the disclosure, the program instructions further cause the processor set to generate a threshold condition associated with mobility of the at least one mini vehicle based on at least one physical attribute of the at least one mini vehicle and the second attribute data of the container. The program instructions further cause the processor set to detect an anomaly associated with the mobility of the at least one mini vehicle based on a violation of the threshold condition by the at least one state parameter.

In various embodiments of the disclosure, the program instructions further cause the processor set to generate transfer record data for the container based on movement of the container from the carrier vehicle to the transportation vehicle. The program instructions further cause the processor set to update a transfer log database based on the transfer record data.

In various embodiments of the disclosure, the first attribute data is associated with at least one of a first physical dimension of the transportation vehicle or a first identifier of the transportation vehicle. The second attribute data is associated with at least one of a second physical dimension of the container or a second identifier of the container.

In various embodiments of the disclosure, a computer program product for automated transfer of a container from a carrier vehicle to a transportation vehicle is described. The computer program product includes one or more computer-readable storage media and program instructions stored on the one or more computer-readable storage media to perform operations including obtaining first attribute data of a transportation vehicle, second attribute data of a container on a carrier vehicle, first position data of the transportation vehicle, and second position data of the carrier vehicle. The operations further include authenticating the transportation vehicle for container transfer of the container. The authentication of the transportation vehicle is based on the first attribute data and the second attribute data. The operations further include generating a transfer trajectory between the carrier vehicle and the transportation vehicle, based on the first position data and the second position data. The transfer trajectory is associated with the container. The operations further include controlling an electromechanical platform to movably extend in a space between the carrier vehicle and the transportation vehicle to create a transfer path for the container. The operations further include identifying a set of mini vehicles from a plurality of mini vehicles, based on the second attribute data of the container. The operations further include controlling each mini vehicle of the set of mini vehicles to move the container from the carrier vehicle to the transportation vehicle along the electromechanical platform, based on the transfer trajectory.

In various embodiments of the disclosure, the first attribute data is associated with at least one of a first physical dimension of the transportation vehicle or a first identifier of the transportation vehicle. The second attribute data is associated with at least one of a second physical dimension of the container or a second identifier of the container.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations may be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that may retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or freely propagating electromagnetic waves, electromagnetic waves propagating through a waveguide, light pulses passing through a fiber optic cable, electrical signals communicated through a wire, and/or a suitable transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for the automated transfer of containers for multimodal transportation, in accordance with an embodiment of the disclosure. With reference to FIG. 1, there is shown a computing environment 100 that contains an example of an environment for the execution of at least some of the computer code involved in performing the disclosed methods, such as an automated container transfer code 120B. In addition to the automated container transfer code 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the automated container transfer code 120B as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or a suitable wearable computer, a mainframe computer, a quantum computer, or any suitable form of a computer or a mobile device now known or to be developed in the future that can be configured for running a program, accessing a network or querying a database, such as a remote database 108A. As is well understood in the art of computer technology, and depending upon the technology, the performance of a computer-implemented method may be distributed among multiple computers and/or between multiple locations. It may be contemplated that in this presentation of the computing environment 100, detailed discussion is focused on a single computer, specifically the computer 102, to keep the presentation as simple as possible. The computer 102 may be located in a cloud, even though it is not shown in a cloud in FIG. 1. Alternately, the computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computers 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in various types of computer-readable storage media, such as the cache 114B and the storage media discussed below. The program instructions, and associated data, are accessed by the processor set 114 to control and direct the performance of the disclosed methods. In computing environment 100, at least some of the instructions for performing the disclosed methods may be stored in the dynamic modification of the automated container transfer code 120B in the persistent storage 120.

The communication fabric 116 is the signal conduction path that allows the various components of computer 102 to communicate. Typically, this fabric is made of switches and electrically conductive paths, such as the switches and electrically conductive paths that make up buses, bridges, physical input/output ports, and the like. Additionally or alternately, any suitable types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the automated container transfer code 120B typically includes at least some of the computer code involved in performing the disclosed methods.

The peripheral device set 122 includes the set of peripheral devices of computer 102. Data communication connections between the peripheral devices and the rest of the components of the computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In various embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that may be used in Internet of Things applications. For example, a first sensor of the sensors may be a thermometer and a second sensor of the sensors may be a motion detector.

The network module 124 is the collection of computer software, hardware, and firmware that allows computer 102 to communicate with external computers through WAN 104. The network module 124 may include hardware, such as modems or Wi-Fi signal transceivers, software for packetizing and/or de-packetizing data for communication network transmission, and/or web browser software for communicating data over the internet. In various embodiments of the disclosure, network control functions, and network forwarding functions of the network module 124 are performed on the same physical hardware device. In various embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods may typically be downloaded to computer 102 from an external computer or external storage device through a network adapter card or network interface included in the network module 124.

The WAN 104 is any wide area network (for example, the internet) communicates computer data over non-local distances by any technology for communicating computer data, now known or to be developed in the future. In various embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation may typically be communicated from the network module 124 of computer 102 through WAN 104 to EUD 106. In this way, the EUD 106 may display, or otherwise present recommendations to an end user. In various embodiments of the disclosure, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machines that collect and store helpful and useful data for use by computing systems such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or computation abilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system may utilize all resources of that computer, such as connected devices, files and folders, network shares, CPU power, and quantifiable hardware resources. However, programs running inside a container may only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2A:
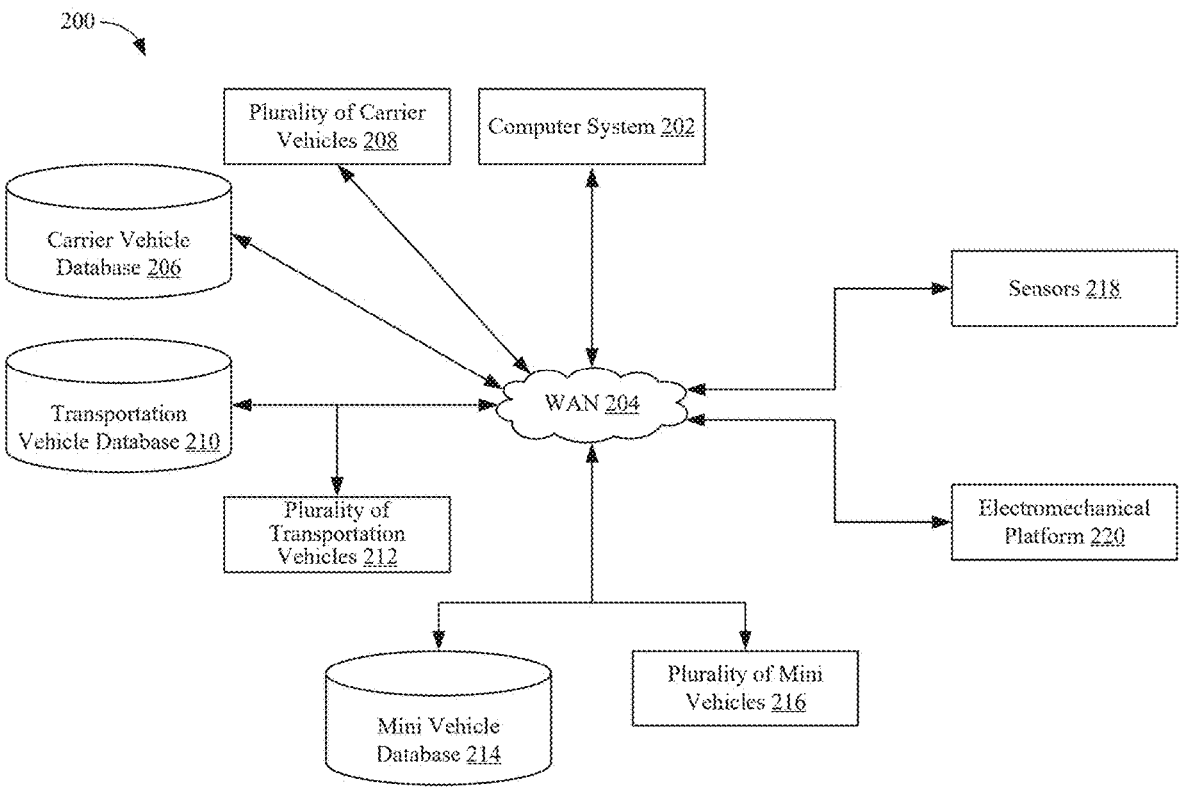
FIG. 2A is a diagram that illustrates a computer system for the automated transfer of containers for multimodal transportation, in accordance with an embodiment of the disclosure.

FIG. 2A is a diagram that illustrates a computer system 202 for the automated transfer of containers for multimodal transportation, in accordance with an embodiment of the disclosure. FIG. 2A is explained in conjunction with elements from FIG. 1. FIG. 2A illustrates the computing environment 200 including a computer system 202 communicatively coupled through a network 204 such as the WAN 104 of FIG. 1 to a carrier vehicle database 206, a plurality of carrier vehicles 208, a transportation vehicle database 210, a plurality of transportation vehicles 212, a mini vehicle database 214, a plurality of mini vehicles 216, sensors 218, and an electromechanical platform 220.

The computing environment 200 enables seamless coordination and execution between the computer system 202 and the carrier vehicle database 206, the plurality of carrier vehicles 208, the transportation vehicle database 210, the plurality of transportation vehicles 212, the mini vehicle database 214, the plurality of mini vehicles 216, sensors 218, and the electromechanical platform 220 for carrying out container transfer operations. In various embodiments, the computer system 202 serves as a central controller, orchestrating and managing the operations of various components for an automated container transfer process. The computer system 202 processes input data from multiple sources, generates control commands and monitors real-time performance of the plurality of carrier vehicles 208 (hereinafter also referred to as the carrier vehicles 208), the plurality of transportation vehicles 212 (hereinafter also referred to as the transportation vehicles 212), the plurality of mini vehicles 216 (hereinafter also referred to as the mini vehicles 216), and the electromechanical platform 220. The implementation of the computer system 202 may vary widely depending on the operational requirements and environment. For instance, the computer system 202 may function as a standalone device located in a central control room at a logistics hub managing operations on a large scale. Alternatively, the computer system 202 may run as a mobile application on a smartphone or tablet, allowing operators to control and monitor container transfers remotely. In advanced vehicle systems, the computer system 202 may be embedded within the instrument clusters of the carrier vehicles 208 or the transportation vehicles 212, ensuring seamless integration with vehicle operations and direct access to navigation or telemetry data. In addition, or in alternate to these configurations, the computer system 202 may adopt a distributed architecture, where processing is shared between cloud-based servers and edge devices. Such a setup allows for real-time decision-making by offloading computationally intensive tasks to the cloud. Embedded computer systems may be incorporated directly into each mini vehicle of the plurality of mini vehicles 216, enabling localized control for navigation, load management, and state parameter monitoring while maintaining synchronization with the central system. In environments requiring high security and transparency, the computer system 202 may integrate blockchain technology to ensure the integrity of data related to container transfers, providing an immutable and auditable trail. The computer system 202 may also leverage wearable devices such as augmented reality (AR) glasses or smartwatches to provide operators with real-time alerts, visual overlays, or haptic feedback. Additionally, the computer system 202 may integrate with IoT sensors deployed across vehicles and infrastructure, creating a decentralized control network. Advanced implementations may include predictive analytics powered by artificial intelligence. For enhanced interaction, the computer system 202 may include holographic interfaces or voice-controlled functionality, allowing operators to issue commands or monitor processes without relying on physical devices. In challenging environments, such as deserts or outer space, the computer system 202 may integrate with environmental sensors to monitor conditions like weather or radiation and adjust operations accordingly.

The carrier vehicle database 206 stores vital information about the plurality of carrier vehicles 208, which may range from conventional transport options like trucks, trains, and ships to advanced modes like spacecraft. The carrier vehicle database 206 ensures that the system may accommodate a wide variety of carrier vehicles, tailoring the transfer process to their specific requirements. Entries in the carrier vehicle database 206 may include identifier information such as registration number of one or more vehicles of the carrier vehicles 208, physical dimensions of each vehicle of the carrier vehicles 208, load limits of each vehicle of the carrier vehicles 208, maintenance history of each vehicle of the carrier vehicles 208, and operational constraints associated with each vehicle of the carrier vehicles 208. For example, in a terrestrial shipping scenario, the carrier vehicle database 206 may store details such as the truck's axle load limits and Global Positioning System (GPS) tracking data. In a maritime shipping scenario, the carrier vehicle database 206 may include the vessel's container stacking configurations and maximum weight capacities. For space-based applications, at least one vehicle of the carrier vehicles 208 may be a spacecraft, with the database storing details such as its orbital parameters, docking capabilities, and payload constraints.

Each vehicle of the carrier vehicles 208 serves as the initial platform holding and delivering containers to one or more vehicles of the transportation vehicles 212. A carrier vehicle may take many forms. As a ground-based vehicle, a carrier vehicle encompasses trucks, lorries, dumpers, trains, and the like. As a water-based vehicle, a carrier vehicle may range from cargo ships, boats, and hovercrafts. In air transport, a carrier vehicle may be a cargo plane, a helicopter, or an unmanned aerial vehicle. In space applications, a carrier vehicle may include a visitor spacecraft delivering payloads to a host spacecraft, celestial bodies, orbital stations, or lunar landers. Irrespective of its form and implementation, a carrier vehicle may be a vehicle holding a container for transfer to a transportation vehicle. That is, the carrier vehicle is a source or origin point within the container transfer operation.

The transportation vehicle database 210 stores data about one or more vehicles of the transportation vehicles 212. The transportation vehicle database 210 contains various types of data, including vehicle identification information such as registration numbers, model types, and unique identifiers, as well as physical characteristics such as dimensions, cargo capacity, and loading mechanisms associated with the one or more vehicles of the transportation vehicles 212. The transportation vehicle database 210 may also store operational data such as fuel or battery levels, performance metrics, and environmental conditions monitored by one or more sensors of the sensors 218 mounted on each transportation vehicle. Additionally, logistical data such as a transportation vehicle's current location, estimated arrival time, and route information may also be stored and continuously updated on the transportation vehicle database 210. For transportation vehicles such as drones or spacecraft, the transportation vehicle database 210 may store specialized data such as payload capacity, flight or orbital data, and mission schedules. Historical information, including past performance and maintenance records, is also stored for future reference. The data stored in the transportation vehicle database 210 may be real-time or predefined.

The computer system 202 utilizes the carrier vehicle database 206 and the transportation vehicle database 210 for the selection of one or more carrier vehicles and one or more transportation vehicles, respectively for container transfer. The data stored in the transportation vehicle database 210 helps the computer system 202 identify the most suitable carrier vehicle based on factors like cargo size, weight, and transport speed. For example, if the container placed on the carrier vehicle is large or requires rapid delivery, the computer system 202 may select a high-capacity transportation vehicle like a truck, aircraft, or even a drone. Additionally, the transportation vehicle database 210 aids in scheduling the transportation vehicles 212, ensuring that the chosen transportation vehicle is available and aligned with the transfer timelines.

Each vehicle of the transportation vehicles 212 is configured for transporting containers between at least two locations and may take various forms depending on the context. For example, as a ground-based vehicle, a transportation vehicle may be a truck, a lorry, or a train. In air transport, transportation vehicles 212 may be cargo planes transporting goods globally or drones performing last-mile deliveries. In water-based scenarios, transportation vehicles 212 may be ships, ferries, or cargo boats moving containers across rivers or coastal areas. In advanced applications, transportation vehicles 212 may also include space-based vehicles like geostationary satellites receiving payloads from spacecraft or Mars rovers transferring scientific equipment between exploration sites. The distinction lies in their roles. For example, a carrier vehicle serves as the origin or intermediary in the transfer process, while a transportation vehicle moves a container a step closer to its final destination. In some cases, these roles may overlap, such as when a spacecraft acts as both a carrier vehicle and transportation vehicle by delivering payloads to orbit and docking them at a station.

The sensors 218 integrated with the computer system 202 provide real-time data for precise operations. A wide range of sensors 218 may be deployed, depending on the specific requirements of the operation. For instance, the computer system 202 may communicate with position tracking sensors for determining the real-time location of at least one of a carrier vehicle, a transportation vehicle, or one or more mini vehicles of the plurality of mini vehicles 216, ensuring accurate alignment and coordination. The sensors 218 may include position sensors, image sensors, acoustic sensors, light or radiation sensors, temperature sensors, pressure sensors, humidity sensors, voltage sensors, current sensors, orientation sensors, compasses, and the like. For example, Light Detection and Ranging (LiDAR) sensors generate detailed three-dimensional (3D) maps of the environment, enabling the system to detect obstacles, assess distances, and align a set of mini vehicles of the plurality of mini vehicles 216 and the electromechanical platform 220 with high precision. Obstacle detection sensors may assist in detecting nearby objects, preventing potential collisions by triggering corrective actions when required. Acoustic sensors monitor sound patterns, helping detect any unusual noise indicating potential mechanical malfunctions, such as issues in the motors or platform mechanisms. Speed sensors track the movement speed of the set of mini vehicles of the plurality of mini vehicles 216 and the electromechanical platform 220, ensuring the sensors 218 operate within safe limits. Load sensors measure the weight of the container, ensuring the set of mini vehicles of the plurality of mini vehicles 216 that carry the container operate within their individual load capacity. Environmental sensors monitor factors such as temperature, humidity, and wind speed. These environmental sensors help the system adapt to external conditions, like high winds or varying temperatures, which may affect the transfer process, especially in outdoor or variable environments. Additionally, proximity sensors, infrared sensors, camera-based vision systems, force/torque sensors, vibration sensors, GPS sensors, gyroscopic sensors, wearable sensors, and magnetic sensors may be used.

The electromechanical platform 220 may be an assembly of electronic and mechanical components designed to facilitate the efficient transfer of containers or payloads. As such, the electromechanical platform 220 may take various configurations depending on the specific needs and operational environment. The electromechanical platform 220 may include mechanical components such as gears, pulleys, and levers propelled and actuated by electronic components such as motors or piezoelectric actuators to provide a platform for the transfer of containers. For example, electric-powered conveyor systems or robotic arms may be used to lift and move containers. As such, the electromechanical platform 220 may be a hybrid mechanism that combines mechanical structures with electric-powered systems. The electromechanical platform 220 may have a controlled movement along multiple directions thereby exhibiting operations such as lifting, sliding, and rotating containers in various orientations. The electromechanical platform 220 may be used in automated systems for loading and unloading containers from different transportation vehicles like trucks, trains, and ships. In various embodiments, the electromechanical platform 220 may be a hydraulically or pneumatically controlled platform configured to lift and move very heavy containers. In environments where friction must be minimized or where precise control of movement is required, an electromagnetic or magnetic levitation platform may be used as the electromechanical platform 220.

Each mini vehicle of the plurality of mini vehicles 216 may comprise an autonomous or semi-autonomous vehicle designed to perform specific tasks, such as transporting, lifting, or adjusting the position of containers in environments like warehouses, ports, or even in more complex settings like space stations or transportation networks. Each mini vehicle of the plurality of mini vehicles 216 may be equipped with advanced sensors, actuators, and propulsion systems which allow them to perform their tasks with high precision and flexibility. The movement and configuration of a mini vehicle may vary widely depending on its design, intended use, and operational environment. Each mini vehicle of the plurality of mini vehicles 216 may be equipped with a set of wheels commonly used in environments where the terrain is relatively smooth, such as warehouses or logistics centers. The wheels of each mini vehicle of the plurality of mini vehicles 216 may be omnidirectional for flexible movement, or standard wheels for more traditional forward/reverse movement. Alternately, the plurality of mini vehicles 216 may have tracks, which provide greater stability and traction on rough or uneven surfaces, making them suitable for outdoor environments like docks or ports, or on rugged terrains. The tracked vehicles may carry heavier loads and better handle uneven surfaces. In certain specialized applications, the plurality of mini vehicles 216 may use magnetic or electromagnetic systems to levitate, reducing friction and enabling smooth, contactless movement. These levitating mini vehicles may be used in environments where minimal friction is required, such as clean rooms, space stations, or even advanced robotics environments. In some examples, the plurality of mini vehicles 216 may be designed with modular or multi-wheel configurations, allowing them to carry heavier loads or maneuver around difficult obstacles by attaching or detaching additional wheels or modules as needed. Advanced versions of the plurality of mini vehicles 216 may incorporate robotic arms or attachments that allow them to pick up, manipulate, or adjust the position of containers or payloads. In various embodiments, the plurality of mini vehicles 216 may be autonomous vehicles, such that the plurality of mini vehicles 216 may be configured to navigate, load, and unload containers.

The mini vehicle database 214 serves as a repository of information about the plurality of mini vehicles 216. The mini vehicle database 214 may be integrated into a control system or distributed across various nodes. The mini vehicle database 214 maintains a comprehensive record of each mini vehicle's unique identifier, allowing precise tracking and assignment of tasks. The mini vehicle database 214 may store the real-time status of the plurality of mini vehicles 216, including whether a mini vehicle of the plurality of mini vehicles 216 is active, idle, or under maintenance, ensuring efficient task allocation and preventing disruptions caused by unprepared vehicles. Details such as the load-carrying capacity of each mini vehicle of the plurality of mini vehicles 216 are also recorded, enabling the computer system 202 to assign tasks appropriately and avoid overloading, which may result in operational inefficiencies or equipment damage. The mini vehicle database 214 tracks battery levels and power status for electric or autonomous mini vehicles, ensuring each mini vehicle has sufficient charge for uninterrupted operation. Maintenance and repair logs are also maintained, recording service history, parts replacements, and preventative maintenance schedules. Furthermore, the mini vehicle database 214 includes real-time location and positioning data of the plurality of mini vehicles 216, often using GPS or similar tracking systems, to monitor and coordinate their movement during container transfer operations. The mini vehicle database 214 may also capture performance metrics such as speed, energy consumption, and workload, which may be analyzed to improve efficiency. The type and configuration of each mini vehicle, whether wheeled, tracked, or levitating, along with any additional features like robotic arms or specialized sensors, may also be specified in the mini vehicle database 214. Additionally, the mini vehicle database 214 maintains a log of completed tasks, routes taken, and time spent on operations, providing a transparent history of vehicle activity. In advanced systems, the mini vehicle database 214 may integrate with artificial intelligence or machine learning tools to predict maintenance needs, optimize load distribution, or improve operational strategies. In various embodiments, the mini vehicle database 214 may store real time or near real time values corresponding to state parameters of the plurality of mini vehicles 216. In this regard, the state parameters of a mini vehicle may comprise operational parameters defining a state of each mini vehicle of the plurality of mini vehicles 216. These may include each mini vehicle's position, orientation, temperatures, a loaded weight, a wheel friction coefficient of each wheel, a skidding coefficient of each wheel, a battery or fuel level, and the like.

The network 204 serves as the communication backbone of the computer system 202, enabling seamless data exchange between the computer system 202, the carrier vehicles 208 and the transportation vehicles 212, their respective databases, the sensors 218, the plurality of mini vehicles 216, and the electromechanical platform 220. The network 204 may be implemented using a variety of technologies to suit different operational contexts. Wired networks, such as Ethernet or fiber optic connections, are ideal for stationary or highly secure installations, offering high-speed and reliable communication. Conversely, wireless networks, including Wi-Fi, 5G, Zigbee, LoRaWAN, and satellite communication, provide flexibility and scalability for mobile or remote operations. For example, in a logistics hub, the plurality of mini vehicles 216 and the computer system 202 perform high-speed, low-latency communication through Wi-Fi or 5G networks, enabling real-time tracking and control. In remote or extreme environments, such as offshore platforms or disaster zones, satellite communication ensures uninterrupted data flow and coverage, even when traditional networks are unavailable. Additionally, data communication among the plurality of mini vehicles 216 and/or data communication between the computer system 202 and each mini vehicle of the plurality of mini vehicles 216 may occur through one or more mesh networks. The network 204 also integrates advanced technologies like edge computing, where the plurality of mini vehicles 216 or the sensors 218 process data locally and share only specified information with the computer system 202. IoT protocols, such as Message Queuing Telemetry Transport (MQTT) or Constrained Application Protocol (CoAP), may be employed to manage large-scale device communications efficiently, while secure network layers, such as Virtual Private Networks (VPNs) or blockchain technology, may be used. In specialized applications, such as aerospace operations, the network 204 may incorporate high-frequency communication systems like Ka-band satellite links for faster data transmission between spacecraft or ground stations. In an automated smart port, ultra-wideband (UWB) networks may be used for precise location tracking and coordination of the plurality of mini vehicles 216 moving containers.

In various embodiments, although not shown in FIG. 2A, the computer system 202 may additionally be coupled to a container database storing data of containers including physical dimensions, physical weight, physical composition, special attributes, information regarding contents of the container, and the like.

Figure 2B:
FIG. 2B is a diagram that illustrates an exemplary framework for the automated transfer of containers for multimodal transportation, in accordance with an embodiment of the disclosure.
Figure 2B:
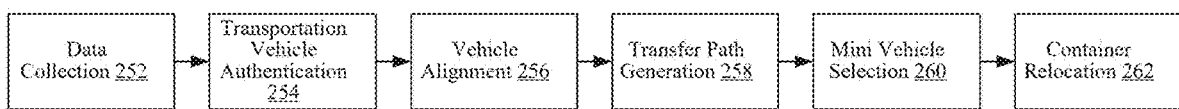

FIG. 2B is a diagram that illustrates an exemplary framework 250 for the automated transfer of containers for multimodal transportation, in accordance with an embodiment of the disclosure. FIG. 2B is explained in conjunction with elements from FIG. 1 and FIG. 2A. The framework 250 includes operations or processes for data collection 252, transportation vehicle authentication 254, vehicle alignment 256, transfer path generation 258, mini vehicle selection 260, and container relocation 262. Additional or fewer processes than the ones shown in FIG. 2B may also be possible within the scope of this disclosure. The framework 250 may be executed as a workflow by the computer system 202 of FIG. 2A on demand or automatically when a container is made available for intermodal transportation. The computer system 202 may execute each process of the framework 250 in an organized sequence for conducting the automated transfer of the container from a carrier vehicle to a transportation vehicle using an electromechanical platform and a set of mini vehicles of the plurality of mini vehicles 216.

The framework 250 for the automated transfer of containers includes a process for data collection 252 that involves acquiring needed inputs for the automated container transfer process. In this regard, the process for data collection 252 includes obtaining the first attribute data of a transportation vehicle, the second attribute of the container, and the position data of both the transportation vehicle and the carrier vehicle. In a synchronized setup, data from the carrier vehicle, transportation vehicle, and data about the container are captured through interconnected sensors and databases, enabling rapid real-time processing. In a sequential approach, the computer system 202 may acquire the physical dimensions and weight of the container from the carrier vehicle, followed by retrieving the location and orientation data of the transportation vehicle. The first attribute data of the transportation vehicle includes parameters such as dimensions, load capacity, operational constraints, and unique identifiers like Radio Frequency Identification (RFID) tags, license plates, or vehicle IDs of the transportation vehicle. The second attribute data of the container encompass physical dimensions, weight, attachment points, and any specialized handling instructions, such as whether the container requires refrigeration or contains hazardous materials. The process for data collection 252 also involves acquiring position data of the transportation and carrier vehicles. The first position data represents the exact location and optionally orientation of the transportation vehicle, while the second position data pertain to the carrier vehicle's location and container position on the carrier vehicle. Sensors such as GPS modules, LiDAR systems, and onboard navigation devices may be used to gather this information. For instance, in a dockyard, the carrier vehicle may provide precise data about the container's placement on a ship, while the transportation vehicle may report its parked position on the dock. In some embodiments, the computer system 202 may execute the process for data collection 252 by establishing a communication link with one or more databases associated with the carrier vehicles, one or more databases associated with the transportation vehicles, and one or more databases associated with the plurality of mini vehicles 216.

The framework 250 for the automated transfer of containers also includes a process for transportation vehicle authentication 254. In the process for transportation vehicle authentication 254, the computer system 202 authenticates every candidate transportation vehicle to confirm whether the candidate transportation vehicle satisfies the eligibility for container transfer. In this regard, at least some of the data collected in the process for data collection 252 is utilized to authenticate the candidate transportation vehicle, ensuring that the transportation vehicle is authorized to conduct the container transfer. The process for transportation vehicle authentication 254 ensures that only authorized transportation vehicles are allowed to engage in the container transfer process. The computer system 202 may obtain an identifier associated with a candidate transportation vehicle and compare it with a list of authorized transportation vehicles to ascertain whether the candidate transportation vehicle should be allowed to proceed further for collecting a container or not. Additionally, or alternately, the computer system 202 may compare the first attribute data of the candidate transportation vehicle with the second attribute data of the container to be transferred to ascertain whether the candidate transportation vehicle can transport the container or not. As an example, the load carrying capacity of the candidate transportation vehicle may be compared with the physical weight of the container. If the load carrying capacity of the candidate transportation vehicle is greater than the physical weight of the container, the candidate transportation vehicle may be permitted to proceed with collecting the container. Otherwise, the candidate transportation vehicle may be skipped and a different transportation vehicle from the plurality of transportation vehicles 212 may be selected as the candidate transportation vehicle and the process for transportation vehicle authentication 254 may be repeated.

Other operations such as verifying the candidate transportation vehicle's credentials, such as registration details, driver or operator authorization, and any encrypted digital keys may also be included as part of the process for transportation vehicle authentication 254. The computer system 202 also evaluates the candidate transportation vehicle's attributes and features against the container's requirements to ensure a match. For example, the computer system 202 checks whether the candidate transportation vehicle's weight-carrying capacity and dimensions align with the container's physical attributes. If a mismatch is detected, the system may reject the candidate transportation vehicle and select a different transportation vehicle. For unique applications, such as a space-bound transportation vehicle designed to deliver cargo to a geostationary satellite, the computer system 202 may also validate orbital alignment capabilities. Similarly, a truck at a logistics hub may be authenticated via RFID scanning or a digital permit system, ensuring both security and operational readiness.

The framework 250 for the automated transfer of containers further includes a process for vehicle alignment 256. The process for vehicle alignment 256 includes operations for precisely aligning the authenticated transportation vehicle with the container on the carrier vehicle. The computer system 202 leverages the first position data of the transportation vehicle, the second position data of the carrier vehicle, the position of the container on the carrier vehicle, and the dimensions of the container collected as a part of the process for data collection 252 to generate precise control commands for guiding the authenticated transportation vehicle and/or the carrier vehicle such that the docking platform on the authenticated transportation vehicle is aligned with the carriage base of the carrier vehicle that holds the container. The alignment of the authenticated transportation vehicle and the carrier vehicle/container may be achieved using advanced technologies such as GPS for broader location data, LiDAR for fine-tuned spatial awareness, and ultrasonic sensors to measure proximity and adjust positioning with millimeter-level accuracy. For example, if the carrier vehicle is a rail car and the transportation vehicle is a truck, the computer system 202 may instruct the truck to adjust its alignment and position with respect to the rail car until the docking platform of the truck is perfectly aligned with the container. The computer system 202 may utilize neural networks and advanced algorithms to achieve such an alignment using real-time data from sensors monitoring the position and orientation of the authenticated transportation vehicle and the carrier vehicle. In this regard, one or more alignment metrics may be used as parameters to define one or more optimization problems for minimizing or maximizing such parameters depending on the objective functions. For example, where the alignment between the carrier vehicle and the transportation vehicle is defined in terms of the angle between the body axis of the carrier vehicle and the body axis of the transportation vehicle, the objective function may aim to minimize this angle to zero. As an additional example, where the alignment between the carrier vehicle and the transportation vehicle is defined in terms of the first distance between an anchor point on the carrier vehicle and an anchor point on the transportation vehicle, the objective function may aim to minimize the first distance to be less than a threshold distance. A computing device such as the computer 102 may solve such an optimization problem to ensure that the transportation vehicle is aligned with the carrier vehicle (or precisely the container on the carrier vehicle) for efficient container transfer.

The framework 250 for the automated transfer of containers also includes a process for transfer path generation 258. The process for transfer path generation 258 involves two sets of interconnected operations such as transfer trajectory generation operations and electromechanical platform control operations.

The computer system 202 executes the transfer trajectory generation operations to determine a transfer trajectory between the carrier vehicle and the aligned transportation vehicle. The transfer trajectory outlines a trail of points in a physical space between the transportation vehicle and the carrier vehicle. As such, the transfer trajectory is an unobstructed path for the movement of the container from the carrier vehicle to the transportation vehicle. To generate the transfer trajectory, the computer system 202 considers factors such as the relative positions of the vehicles, the weight and size of the container, and any environmental constraints like obstacles or uneven terrain. For instance, if the carrier vehicle is a docked ship and the transportation vehicle is a truck on a sloped surface, the transfer trajectory ensures safe and balanced movement by accounting for the gradient. As an example, the computer system 202 may generate the transfer trajectory as a path connecting the locations of the transportation vehicle and the carrier vehicle such that a container can be moved along such a path without collision.

In various example embodiments, the container is moved between the carrier vehicle and the transportation vehicle using an electromechanical platform. The computer system 202 controls the electromechanical platform to position it in such a way that the transfer trajectory passes through a horizontal plane of the electromechanical platform. Towards this end, the computer system 202 executes the electromechanical platform control operations to extend and optionally maneuver the electromechanical platform in a space between the two vehicles. In this regard, the electromechanical platform 220 may comprise multiple discrete sub-platforms that are extendible in a sequence defined by the transfer trajectory. For example, the total length of the transfer trajectory may be expressed in multiples of the size of each sub-platform of the multiple discrete sub-platforms (when the sub platforms are of equal lengths) or as a sum of the individual lengths of each sub-platform of the multiple discrete sub-platforms (when the sub platforms are of unequal lengths). Alternately, in various embodiments, the electromechanical platform 220 may be a single continuous platform that is extendible and collapsible to take various shapes and sizes. Thus, the computer system 202 may control the electromechanical platform 220 to create a physical bridge between the two vehicles. For example, in a logistics hub, the electromechanical platform may adjust its height dynamically to align with a truck's container bed.

The framework 250 for the automated transfer of containers also includes a process for mini vehicle selection 260. The objective of this process is to ensure that the most suitable mini vehicles among the plurality of mini vehicles 216 are chosen for the efficient and safe transfer of the container on the electromechanical platform 220. Towards this end, the computer system 202 may select a set of mini vehicles from the plurality of mini vehicles 216 considering one or multiple factors such as the physical size of the container, the physical weight of the container, load carrying capacity of each mini vehicle of the plurality of mini vehicles 216, the distance to be covered by each mini vehicle of the plurality of mini vehicles 216 to carry out the container transfer, etc. In an embodiment, the computer system 202 may only determine the count or number of mini vehicles and select the mini vehicles from the plurality of mini vehicles 216 randomly without considering their attributes and features. In various embodiments, the computer system 202 may determine the count or number of the mini vehicles and select the mini vehicles from the plurality of mini vehicles 216 based on the attributes of the container and the plurality of mini vehicles 216.

To determine the count or number of the mini vehicles for carrying out the container transfer from the carrier vehicle to the transportation vehicle, the computer system 202 determines a plurality of attachment points on the container, based on the physical size/dimensions of the container. An attachment point defines a location on the base of the container where a mini vehicle can latch with the container to lift and carry it during the transfer of the container on the electromechanical platform 220. The computer system 202 may determine the latch points/attachment points about the geometry of the base of the container. The computer system 202 also determines the count or number of mini vehicles to handle the weight of the container for container transfer at least based on the weight of the container and the load carrying capacity of each selected mini vehicle. Heavier containers or those with uneven weight distribution may impose a requirement for a larger number of mini vehicles.

Additionally, the computer system 202 may also take into consideration the container weight, the load carrying capacity of each mini vehicle of the plurality of mini vehicles 216, and the state parameters of each mini vehicle of the plurality of mini vehicles 216 to select mini vehicles best suitable for the container transfer. The state parameters may include battery or fuel level, speed limits, and readiness for alignment (explained briefly in FIG. 6) with the container's transfer trajectory. The mini vehicles of the plurality of mini vehicles 216 with sufficient energy levels and the ability to synchronize with different vehicles of the plurality of mini vehicles 216 in real time may be prioritized. The computer system 202 also considers dynamic factors, such as terrain and environmental conditions, to ensure that the selected mini vehicles may operate efficiently in the given context. The selection of the mini vehicles may include filtering qualifying mini vehicles from a plurality of mini vehicles 216 based on one or more of the aforementioned factors. For example, the computer system 202 may obtain the identifiers of the plurality of mini vehicles 216 and filter the plurality of mini vehicles 216 based on their load-carrying capacities in relation to the physical weight and physical size of the container which is explained in detail with reference to FIG. 2E and FIG. 2F, respectively. For example, mini vehicles of the plurality of mini vehicles 216 that cannot support the container's weight are excluded from the selection and the filtered mini vehicles of the plurality of mini vehicles 216 are utilized for further operations.

The framework 250 for the automated transfer of containers also includes a process for container relocation 262. The computer system 202 executes at least some operations of the process for container relocation 262 in an iterative manner. For conducting the container transfer, the container is moved or carried from the carrier vehicle to the transportation vehicle on the electromechanical platform 220 in accordance with the transfer trajectory. In this regard, the computer system 202 operates the filtered mini vehicles in synchronization to move the container on the electromechanical platform 220. The process for container relocation 262 includes operations for aligning each mini vehicle of the filtered mini vehicles with its corresponding attach point on the container, operations for generating an individual trajectory for each mini vehicle of the filtered mini vehicles, and operations for controlling each mini vehicle of the filtered mini vehicles to move along its corresponding individual trajectory.

The computer system 202 executes the operations for aligning each mini vehicle of the filtered mini vehicles with its corresponding attach point on the container to control each mini vehicle of the aligned mini vehicles to move to a corresponding attach point on the container. In an embodiment, the base of the container may be mounted on a container bed of the carrier vehicle such that there exists a gap under each attach point on the base of the container. As such, the filtered mini vehicles can partially or fully slide under the gap to position themselves with a respective attach point. Alternately or additionally, in some embodiments, the attach points may be on the sides of the container instead of the base such that the filtered mini vehicles can latch with the container through a suitable mechanism that allows the container to be lifted and moved by the latched mini vehicles. Some examples of such latching mechanisms include cam latches, bolt latches, spring latches, and slam latches. The computer system 202 determines the current position of each mini vehicle of the filtered mini vehicles and controls each mini vehicle of the filtered mini vehicles to move to a respective attach point and latch with the container. Once all the mini vehicles of the filtered mini vehicles have moved to their respective attach points and latched with the container the alignment of the mini vehicles is deemed complete.

The computer system 202 then executes the operations for generating an individual trajectory for each mini vehicle of the aligned mini vehicles. Towards this end, the computer system 202 generates an individual trajectory for each mini vehicle of the aligned mini vehicles. The generation of individual trajectory for a mini vehicle is explained in detail with reference to FIG. 2G. It may be noted that an individual trajectory is tailored to a corresponding attachment point on the container and is calculated based on the transfer trajectory and the attach point assigned to that mini vehicle. The individual trajectories ensure that the aligned mini vehicles move in synchronization on the electromechanical platform such that the center of the container is aligned with the transfer trajectory.

The computer system 202 then executes the operations for controlling each mini vehicle of the aligned mini vehicles to move along its corresponding individual trajectory. In an embodiment, the computer system 202 may generate control commands for causing movement of each mini vehicle of the aligned mini vehicles along its trajectory. The control commands may be generated based on the corresponding individual trajectory of each mini vehicle of the aligned mini vehicles. In an embodiment, the computer system 202 transmits the individual trajectory of each mini vehicle of the aligned mini vehicles to the respective mini vehicle of the aligned mini vehicles. In such an embodiment, a controller of each mini vehicle of the aligned mini vehicles may generate the control commands to move the corresponding mini vehicle along its trajectory. In various embodiments, the computer system 202 transmits the individual trajectory of each mini vehicle of the aligned mini vehicles to a swarm controller that operates the aligned mini vehicles. In such an embodiment, the swarm controller generates the control commands for each mini vehicle of the aligned mini vehicles and transmits the respective control commands to the corresponding mini vehicle to move the corresponding mini vehicle along its trajectory.

In this way, through the synchronized movement of the aligned mini vehicles, the computer system 202 causes the movement of the container on the electromechanical platform 220. The computer system 202 controls the movement of the aligned mini vehicles till the container reaches a destination location on the transportation vehicle. The computer system 202 then controls each mini vehicle of the aligned mini vehicle to disengage from the container and return from the transportation vehicle back onto the electromechanical platform. The computer system 202 then controls the electromechanical platform 220 to move to a position from where the disengaged mini vehicles move away from the electromechanical platform 220. For example, after completion of the container transfer from the carrier vehicle to the transportation vehicle, the disengaged mini vehicles may return to a mini vehicle bay or a mini vehicle hub.

In various embodiments, during the movement of the container from the carrier vehicle to the transportation vehicle, the computer system 202 may dynamically monitor one or more conditions to detect an anomaly associated with the mobility of a mini vehicle of the filtered mini vehicles if it occurs. In this regard, the computer system 202 may directly or through a suitable controller, obtain at least one physical attribute of each mini vehicle of the filtered mini vehicles and generate a threshold condition associated with the mobility of each mini vehicle. As an example, the computer system 202 obtains a load carrying capacity of a mini vehicle of the filtered mini vehicles and generates a threshold condition for the maximum load on that mini vehicle as 90% of the load carrying capacity. As an additional example, the computer system 202 obtains a power consumption of a drivetrain of a mini vehicle of the filtered mini vehicles and generates a threshold condition for the rate of drain of the battery of that mini vehicle, based on the power consumption of the drivetrain. In various embodiments, the computer system 202 generates a plurality of such threshold conditions corresponding to a plurality of parameters governing the mobility of the filtered mini vehicles. In various embodiments, some threshold conditions may be predefined and the computer system 202 may obtain them from a suitable repository such as the mini vehicle database 214 of FIG. 2A.

The computer system 202 may continuously obtain the value of at least one state parameter of each mini vehicle of the filtered mini vehicles and correlate it with the corresponding threshold condition to identify a violation of the corresponding threshold condition. If the computer system 202 determines that the corresponding threshold condition has been violated, the computer system 202 declares it as an anomaly associated with the mobility of the corresponding mini vehicle. In such scenarios, the computer system 202 may execute one or more operations to raise an alarm and/or take corrective measures to cure the anomaly. For example, the computer system 202 may seize or halt the movement of the filtered mini vehicles on detecting an anomaly associated with the mobility of a mini vehicle of the filtered mini vehicles.

Furthermore, the computer system 202 may generate transfer record data for the container to create a log of the container movement. In an embodiment, the transfer record data is generated on completion of the container transfer from the carrier vehicle to the transportation vehicle. The computer system 202 updates a transfer log database with the transfer record data. The transfer record data includes data pertaining to the container's movement, mini vehicles used and their performances during the transfer, and the timelines associated with events in the container transfer. The database update aids in tracking the status of the operation, enabling post-operation analysis, and ensuring that data is available for audit, maintenance, or future improvements.

Figure 2C:
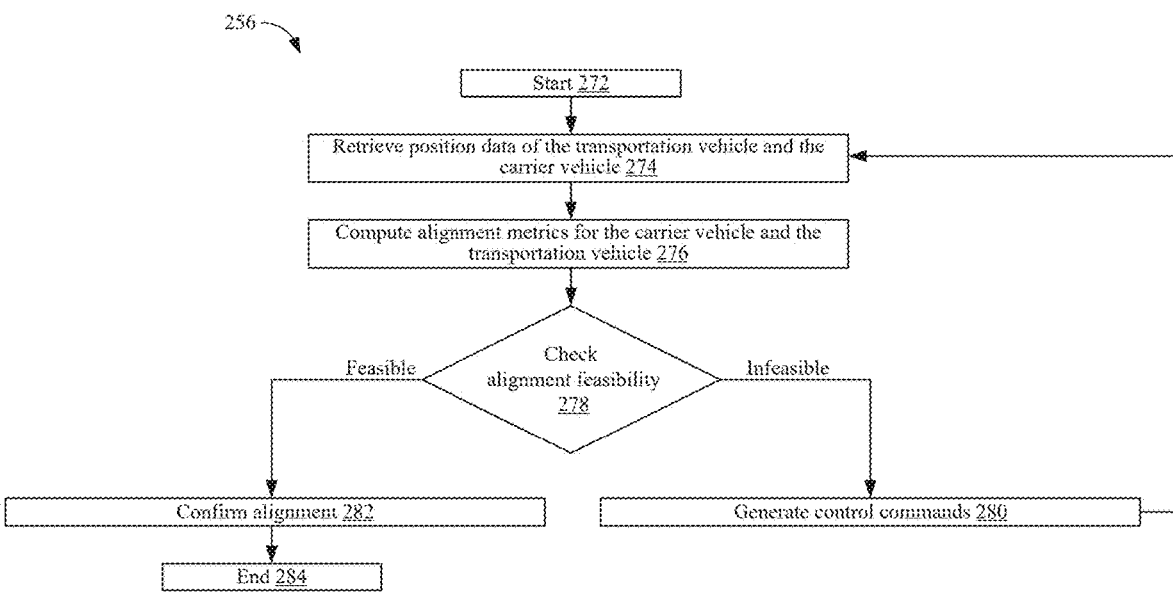
FIG. 2C is a diagram that illustrates a flowchart of a vehicle alignment process of the framework of FIG. 2B, in accordance with an embodiment of the disclosure.

FIG. 2C is a diagram that illustrates a flowchart of the process for vehicle alignment 256 of the framework 250 of FIG. 2B, in accordance with an embodiment of the disclosure. FIG. 2C is explained in conjunction with elements from FIG. 1-2B. With reference to FIG. 2C, there is shown a block diagram of a process for vehicle alignment 256 that illustrates exemplary operations from 272-284, as described herein. The exemplary operations illustrated in the block diagram of the process for vehicle alignment 256 may start at 272 and may be performed by any computing system, apparatus, or device, such as by the computer 102 of FIG. 1. Although illustrated with discrete blocks, the exemplary operations associated with one or more blocks of the process for vehicle alignment 256 may be divided into additional blocks, combined into fewer blocks, or eliminated, depending on the particular implementation. Referring to FIG. 2C, the process for vehicle alignment 256 commences at 272, either manually or automatically. For example, the process for vehicle alignment 256 may be invoked on demand by an operator or a computer program when a transportation vehicle is available for container transfer. Alternately, the process for vehicle alignment 256 may be invoked whenever a carrier vehicle with at least one container is available for intermodal transportation of the container.

The process for vehicle alignment 256 includes at operation 274, retrieving position data of the transportation vehicle and the carrier vehicle. This position data of each vehicle of the transportation vehicle and the carrier vehicle may be sourced from one or a combination of sensors such as GPS, LiDAR, and position-tracking sensors installed on the transportation vehicle and the carrier vehicle or in a vicinity of the transportation vehicle and the carrier vehicle. For example, GPS data provides latitude and longitude information for the transportation vehicle and/or the carrier vehicle, while LiDAR scans give real-time spatial information about the surroundings of the transportation vehicle and/or the carrier vehicle. In various embodiments, the position data of at least one vehicle of the carrier vehicle and the transportation vehicle may be retrieved from a corresponding database such as the carrier vehicle database 206 or the transportation vehicle database 210, respectively.

The process for vehicle alignment 256 further includes at operation 276, computing alignment metrics for the carrier vehicle and the transportation vehicle. This involves calculating at least one of the angle between a body axis of the carrier vehicle and a body axis of the transportation vehicle, a first distance between an anchor point on the carrier vehicle and an anchor point on the transportation vehicle, a second distance between a center of a container bed on the carrier vehicle and a center of a container bed on the transportation vehicle, or a third distance between the center of the transportation vehicle and a center of a bounding box projected for the transportation vehicle. It may be contemplated that various suitable metrics used for defining alignment between three-dimensional objects may also be used in this regard. In various embodiments, apart from the factors governing direct alignment, various factors such as obstacles or terrain variations that may affect the overall alignment between the carrier vehicle and the transportation vehicle, may also be taken into consideration. For example, if the terrain is uneven, the computer system 202 may adjust for that by factoring in height differences between the two vehicles or compensating for any tilts.

The process for vehicle alignment 256 further includes at operation 278, checking the alignment feasibility based on the computed alignment metrics. The check operation determines whether the carrier vehicle and the transportation vehicle are aligned within a specified tolerance limit for each factor governing the alignment. If the alignment metric(s) does/does not satisfy the condition(s) associated with the corresponding tolerance limit(s), the output of operation 278 indicates that the alignment is infeasible. In such a case, the process for vehicle alignment 256 further includes at operation 280, generating control commands to adjust the position of at least one vehicle of the carrier vehicle or the transportation vehicle. The control commands may lead to automated maneuvers or, in certain cases, manual interventions for at least one vehicle of the carrier vehicle or the transportation vehicle. For example, the computer system 202 may direct at least one of the carrier vehicle or the transportation vehicle to shift the position using onboard motors, transmission systems or suitable actuators. Additionally, or alternately, the computer system 202 may generate audio-visual commands to render them through external guidance systems to guide one or more operators to shift at least one of the carrier vehicle or the transportation vehicle. In some scenarios, at least one of the carrier vehicle or the transportation vehicle may respond to a verbal command, such as "align to the container transfer path," or even follow laser-guided instructions where laser light is projected onto a surface such as the ground to depict a bounding box, instructing at least one of the carrier vehicle or the transportation vehicle to move along the specified path to the bounding box. Thereafter the control passes back to operation 274 where the current position of the vehicles is retrieved again and the operations 274-278 are repeated.

However, if the alignment metric(s) satisfies/satisfy the condition(s) associated with corresponding tolerance limit(s), the output of operation 278 indicates that the alignment is feasible. In such a case, the process for vehicle alignment 256 further includes at operation 282, confirming the alignment between the carrier vehicle and the transportation vehicle. Towards this end, a confirmatory or acknowledgment signal is sent to the computing device executing the process for vehicle alignment 256, thus terminating the process for vehicle alignment 256 at operation 284.

Figure 2D:
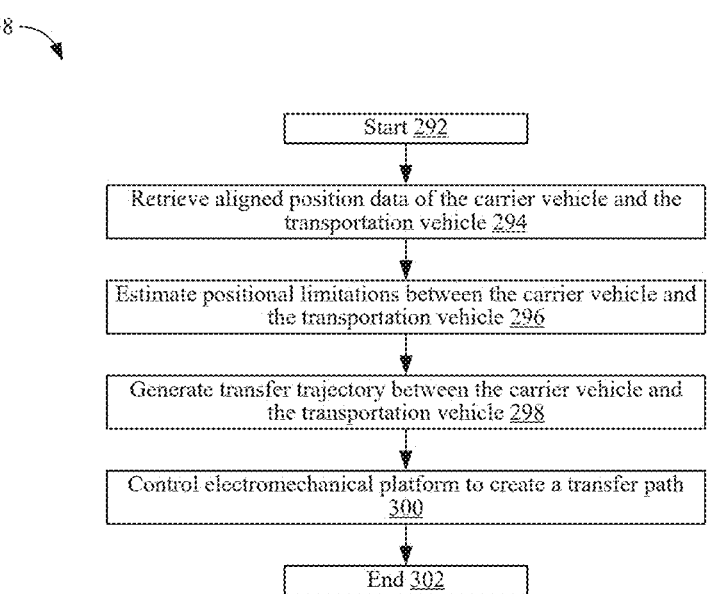
FIG. 2D is a diagram that illustrates a flowchart of a transfer path generation process of the framework of FIG. 2B, in accordance with an embodiment of the disclosure.

FIG. 2D is a diagram that illustrates a flowchart of a process for transfer path generation 258 of the framework of FIG. 2B, in accordance with an embodiment of the disclosure. FIG. 2D is explained in conjunction with elements from FIG. 1-2C. With reference to FIG. 2D, there is shown a block diagram of a process for transfer path generation 258 that illustrates exemplary operations from 292-302, as described herein. The exemplary operations illustrated in the block diagram of the process for transfer path generation 258 may start at 292 and may be performed by any computing system, apparatus, or device, such as by the computer 102 of FIG. 1. For example, the process for transfer path generation 258 may be invoked upon receipt of a confirmation regarding the alignment of the carrier vehicle and the transportation vehicle.

The process for transfer path generation 258 includes at operation 294, retrieving aligned position data of the carrier vehicle and the transportation vehicle. The position data of each vehicle of the transportation vehicle and the carrier vehicle when they are aligned with each other, may be sourced from one or a combination of sensors such as GPS, LiDAR, and/or suitable position-tracking sensors installed on the transportation vehicle and the carrier vehicle or in a vicinity of the transportation vehicle and the carrier vehicle. In various embodiments, the position data of at least one vehicle of the carrier vehicle and the transportation vehicle when they are aligned with each other, may be retrieved from a corresponding database such as the carrier vehicle database 206 or the transportation vehicle database 210, respectively.

The process for transfer path generation 258 includes at operation 296, estimating positional limitations between the carrier vehicle and the transportation vehicle which includes assessing any spatial constraints such as the available space between the carrier vehicle and the transportation vehicle, which may affect the transfer process. For example, the computer system 202 may consider factors like the physical dimensions of each vehicle, their orientation, and terrain of the area where they are located and the like. For example, if the gap between the vehicles is narrow or if the terrain is uneven, the transfer path generation may need to adjust to account for these limitations. In this regard, the data regarding those spatial constraints may be obtained from one or more suitable sources. For example, a LiDAR sensor may scan the space between the vehicles to ascertain if the space includes any physical body that can affect the container transfer between the two vehicles. As an additional example, satellite images of the region in which the vehicles are located may be obtained to assess such an obstruction. The goal here is to take into account every such spatial constraint that can function as a physical hindrance to the container transfer between the vehicles.

The process for transfer path generation 258 includes at operation 298, generating transfer trajectory between the carrier vehicle and the transportation vehicle. The transfer trajectory is a calculated path through which the container is transferred between the carrier vehicle and the transportation vehicle. As such, the generation of the transfer trajectory is based on the aligned position data retrieved at operation 294 and the positional limitations estimated at operation 296. In various embodiments, the computer system 202 calculates the transfer trajectory between the carrier vehicle and the transportation vehicle using algorithms that factor in the position data as well as the relative movements of the vehicles, container characteristics (e.g., shape, load distribution), and presence of obstacles. Advanced algorithms may be used to predict how the transfer trajectory may interact with any environmental changes, such as wind or vibrations, which may impact the stability of the transfer. The computer system 202 generates a series of intermediate waypoints that guide the container's movement on the electromechanical platform through the movement of mini vehicles involved in the transfer process.

The process for transfer path generation 258 includes at operation 300, controlling the electromechanical platform to movably extend in the space between the aligned pair of the carrier vehicle and the transportation vehicle to create a transfer path for the container. The electromechanical platform is laid out in such a manner that it aligns with the generated transfer trajectory thus facilitating the actual movement of the container along the transfer trajectory. The electromechanical platform may include a suitable combination of electronic and mechanical components such as robotic arms, motors, or conveyor belts. In various embodiments, to move the container between the carrier vehicle and the transportation vehicle, the electromechanical platform may deploy a suitable mechanism such as a conveyor system to shift the container on the electromechanical platform. In various embodiments, the electromechanical platform may only provide a pathway for the movement of the container, in which case, the aligned mini vehicles may carry the container on the electromechanical platform. The computer system 202 may also utilize a plurality of sensors equipped with the electromechanical platform or in proximity of the electromechanical platform to continuously monitor the container's position and orientation along the transfer path. To control the electromechanical platform to movably extend in the space between the vehicles, the computer system 202 generates commands for the electromechanical platform in accordance with the shape of the transfer trajectory generated at operation 298 to ensure that the container follows the generated transfer trajectory smoothly during transfer. As such, the electromechanical platform may extend along multiple dimensions as a continuous path for the movement of the container. For example, where the transfer trajectory has a shape of a straight line, the electromechanical platform may extend along such a straight line. As an additional example, where the electromechanical platform has the shape of a curved line, the electromechanical platform extends such that it takes the shape of the curved line. In various embodiments, the electromechanical platform in the extended position may have a length that is nearly equal to the length of the transfer trajectory. Alternately, in various embodiments, the length of the transfer trajectory may be a multiple of the length of the electromechanical platform in the extended position. In such a case, the electromechanical platform may itself be movable along the transfer trajectory to facilitate the movement of the container on it. Once the electromechanical platform's extension along the transfer trajectory is completed, it establishes a transfer path between the two vehicles, and the process for transfer path generation 258 concludes at operation 302.

FIG. 2E is a diagram that illustrates a flowchart of a process for container weight-based mini vehicle selection 260A, in accordance with an embodiment of the disclosure. FIG. 2E is explained in conjunction with elements from FIGS. 1-2D. FIG. 2E illustrates a variant of the process for mini vehicle selection 260 of FIG. 2B in detail considering the physical weight of the container. With reference to FIG. 2E, there is shown a block diagram of the process for container weight-based mini vehicle selection 260A that illustrates exemplary operations from 310-316, as described herein. The process for container weight-based mini vehicle selection 260A includes at operation 310, obtaining the second attribute data of the container collected as a part of the process for data collection 252 of FIG. 2B. The physical weight of the container, which is included in the second attribute data, defines the cumulative load that the aligned mini vehicles manage during the container transfer. The physical weight of a container may vary depending on the type and size of the container. As such, the mini vehicles selected for the container transfer should be able to carry the physical weight of the container.

The process for container weight-based mini vehicle selection 260A includes at operation 312, determining the load-carrying capacity of each mini vehicle of the plurality of mini vehicles 216. Several factors influence the load-carrying capacity of a mini vehicle such as the propulsion mechanism, material strength, energy availability, and operational conditions. For example, mini vehicles equipped with robust wheels and suspension systems are well-suited for flat and even surfaces, enabling them to carry heavier loads without significant strain. Material strength plays a vital role in defining the capacity of each mini vehicle of the plurality of mini vehicles 216. Vehicles constructed with high-tensile-strength alloys or carbon fiber components may endure heavier loads. Energy availability and power systems are also significant factors. Mini vehicles of the plurality of mini vehicles 216 that are powered by high-capacity batteries or hybrid energy systems may sustain heavier loads over longer distances. For instance, a mini vehicle equipped with an intelligent energy management system may optimize power usage during load transfer. In an embodiment, the computer system 202 may determine the load carrying capacity of a candidate mini vehicle of the plurality of mini vehicles 216 based on predefined test results pertaining to the material strength evaluation, structural evaluation, and drivetrain power of the mini vehicle. In various embodiments, the data regarding the load carrying capacity of each mini vehicle of the plurality of mini vehicles 216 may be obtained from a suitable repository such as the mini vehicle database 214.

The process for container weight-based mini vehicle selection 260A includes at operation 314, filtering the plurality of mini vehicles 216 based on the physical weight of the container obtained from the second attribute data at operation 310 and the load carrying capacity of each mini vehicle of the plurality of mini vehicles 216 determined at operation 312. Such filtering ensures that only vehicles which satisfy requirements for safely and efficiently transferring the container, are selected. For example, if the container's weight is distributed unevenly, the computer system 202 may select mini vehicles with dynamic load-balancing features from the plurality of mini vehicles 216 to manage the situation. Similarly, mini vehicles operating in environments with rugged terrain may be selected from the plurality of mini vehicles 216 if the transfer path includes such challenges. Operational constraints, such as the available workspace, may also be factored into the filtering. For instance, in confined spaces, compact mini vehicles of the plurality of mini vehicles 216 that have high maneuverability may be prioritized. Conversely, in open areas where speed is critical, the computer system 202 may favor mini vehicles with higher velocity limits and greater load capacities among the plurality of mini vehicles 216. In specialized scenarios, such as the handling of fragile or high-value containers, mini vehicles equipped with shock-absorption systems, precision navigation abilities, or real-time monitoring sensors may be filtered as the most appropriate choice among the plurality of mini vehicles 216.

In an embodiment, depending on the container's size, weight, and the nature of the transfer operation, a single mini vehicle may be sufficient to perform the task. For example, in cases where the transfer involves a high-value container, mini vehicles with additional stability and precision-control mechanisms may be chosen from among the plurality of mini vehicles 216. Alternatively, if the operation occurs in time-sensitive scenarios, mini vehicles with higher operational speed limits may be prioritized from among the plurality of mini vehicles 216. This comprehensive process ensures that the selected mini vehicles meet the operational requirements based on the physical weight of the container. The outcome of the operation 314 yields filtered mini vehicles that satisfy the requirements for carrying the container on the electromechanical platform for the transfer of the container from the carrier vehicle to the transportation vehicle. The process for container weight-based mini vehicle selection 260A includes at operation 316, outputting a set of the filtered mini vehicles for further processing.

FIG. 2F is a diagram that illustrates a flowchart of a process for container size-based mini vehicle selection 260B, in accordance with an embodiment of the disclosure. FIG. 2F is explained in conjunction with elements from FIGS. 1-2E. FIG. 2F illustrates a variant of the process for mini vehicle selection 260 of FIG. 2B in detail considering the physical size of the container. With reference to FIG. 2F, there is shown a block diagram of the process for container size-based mini vehicle selection 260B that illustrates exemplary operations from 320-328, as described herein. The process for container size-based mini vehicle selection 260B includes at operation 320, obtaining the second attribute data of the container collected as a part of the process for data collection 252 of FIG. 2B. The physical size of the container which is included in the second attribute data, defines the dimensions, such as length, width, and height of the container, areas of different surfaces of the container, and volume of the container, and may also consider container-specific details like design specifications or specialized structures, for example, containers with protruding handles or modular attachments. In an embodiment, the data regarding the physical size of the container may be retrieved from a suitable repository such as a container database or the carrier vehicle database 206. Alternately or additionally, the data regarding the physical size of the container may be measured directly or indirectly using sensors such as laser rangefinders or computer vision systems.

The process for container size-based mini vehicle selection 260B includes at operation 322, determining a plurality of attach points on the container. The computer system 202 may determine the attach points based on the data regarding the physical size information. These attach points represent secure positions for engagement by the selected mini vehicles. For example, a standard container may have corner castings or side fittings as predefined attach points, whereas irregularly shaped containers or containers with uneven load distribution may require a dynamic calculation to identify structural positions at which the selected mini vehicles may engage with such containers to safely bear the load of the container. In this regard, the computer system 202 may use Computer-Aided Design (CAD) models, Artificial Intelligence (AI)-based image processing, or preprogrammed templates to determine the attach points.

The process for container size-based mini vehicle selection 260B also includes at operation 324, determining a count of mini vehicles for carrying the container based on a count of the plurality of attach points on the container. For instance, if a container has four corner castings, the computer system 202 may determine the count of the mini vehicles as four. In an embodiment, fewer or a greater number of mini vehicles may be determined based on various parameters such as the container's weight or the operational requirements. For example, if the container's weight is satisfied using the load carrying capacity of four mini vehicles, but the weight or load distribution of the container is uneven, the computer system 202 may allocate more than four mini vehicles to share the load evenly.

The process for container size-based mini vehicle selection 260B also includes at operation 326, selecting a set of mini vehicles of the plurality of mini vehicles 216, whose total count is equal to the count of the mini vehicles (determined at operation 324). In various embodiments, such a selection may also take into account factors such as the operational state of the plurality of mini vehicles 216, their load-carrying capacities, battery levels, and proximity to the container. For example, if some mini vehicles of the plurality of mini vehicles 216 are already engaged in ongoing or pre-assigned tasks or require maintenance, they may be excluded from the selection. As an additional example, mini vehicles of the plurality of mini vehicles 216 that are nearer to the carrier vehicle may be prioritized over those that are farther than a threshold. In various embodiments, the system may also prioritize mini vehicles with specific abilities of the plurality of mini vehicles 216, such as high-speed travel for time-critical transfers or advanced obstacle detection sensors for navigating cluttered environments. The process for container size-based mini vehicle selection 260B also includes at operation 328, outputting the selected set of mini vehicles.

In various embodiments, referring to FIGS. 2E and 2F, the computer system 202 may select the set of mini vehicles using one of the process for container weight-based mini vehicle selection 260A or the process for container size-based mini vehicle selection 260B. In various embodiments, the computer system 202 may select the set of mini vehicles from the plurality of mini vehicles 216 using a combination of the process for container weight-based mini vehicle selection 260A and the process for container size-based mini vehicle selection 260B in any sequence. For example, the set of filtered mini vehicles output at operation 316 of FIG. 2E may be used as the plurality of mini vehicles at operation 326 of FIG. 2F from which the computer system 202 performs the selection of the set of mini vehicles. Alternately, in various embodiments, the set of mini vehicles output at operation 328 of FIG. 2F may be used as the plurality of mini vehicles at operation 312 of FIG. 2E for which the computer system 202 determines the load carrying capacity and the subsequent filtering at operation 314.

Figure 2G:
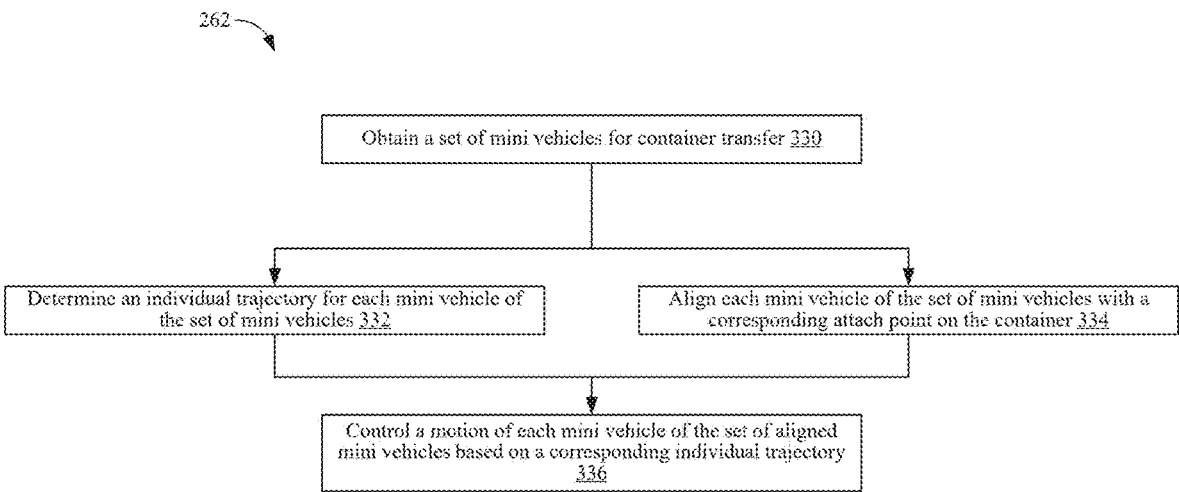
FIG. 2G is a diagram that illustrates a flowchart of a container relocation process of the framework of FIG. 2B, in accordance with an embodiment of the disclosure.

FIG. 2G is a diagram that illustrates a flowchart of a process for container relocation 262 of the framework 250 of FIG. 2B, in accordance with an embodiment of the disclosure. FIG. 2G is explained in conjunction with elements from FIG. 1-2F. With reference to FIG. 2G, there is shown a block diagram of a process for container relocation 262 that illustrates exemplary operations from 330-336, as described herein. The exemplary operations illustrated in the block diagram of the process for container relocation 262 may be executed by any computing system, apparatus, or device, such as by the computer 102 of FIG. 1 or the computer system 202 of FIG. 2A.

The process for container relocation 262 includes at operation 330, obtaining a set of mini vehicles for container transfer. The computer system 202 may obtain the set of mini vehicles as an output of the process for container weight-based mini vehicle selection 260A in the manner described previously with reference to FIG. 2E or as an output of the process for container size-based mini vehicle selection 260B in the manner described previously with reference to FIG. 2F. The objective is to select mini vehicles that are fit for managing the container.

The process for container relocation 262 also includes at operation 332, determining an individual trajectory for each mini vehicle of the set of mini vehicles selected at operation 330. In this regard, the computer system 202 may determine the individual trajectory of each mini vehicle of the obtained set of mini vehicles based on the transfer trajectory and the corresponding attach point of the plurality of attach points on the container. For each mini vehicle of the set of mini vehicles obtained at operation 330, the computer system 202 generates a specific path or route that the mini vehicle has to follow based on the transfer trajectory of the container generated at operation 298 of FIG. 2D and the respective attach point on the container designated for that mini vehicle. It may be contemplated that since each mini vehicle of the obtained set of mini vehicles is attached to a distinct attach point on the container, the trajectory that each mini vehicle has to follow to execute the movement of the container is also distinct owing to a different starting point on the carrier vehicle and a different destination point on the transportation vehicle. In various embodiments, the computer system 202 may generate the individual trajectories iteratively by real-time monitoring of the instantaneous location/position of each mini vehicle of the set of mini vehicles. This ensures that at each point in time, each mini vehicle of the obtained set of mini vehicles moves in a synchronized manner.

The process for container relocation 262 also includes at operation 334, aligning each mini vehicle of the set of mini vehicles obtained at operation 330 with a corresponding attach point on the container. The computer system 202 aligns each mini vehicle of the obtained set of mini vehicles with the corresponding attach point so that the corresponding mini vehicle engages with the container to lift it in a manner so that the container can be moved along the electromechanical platform. In various embodiments, such alignment ensures precise attachment/engagement of the obtained set of mini vehicles with the container and secure handling of the container during the transfer of the container on the electromechanical platform. Approaches involving LiDAR, machine vision, or guided markers may assist in achieving millimeter-level precision. For example, the computer system 202 may communicate the position of each attach point to a respective mini vehicle of the obtained set of mini vehicles such that an onboard controller of each mini vehicle of the obtained set of mini vehicles controls the corresponding mini vehicle to move to its respective attach point. In various embodiment, the computer system 202 may obtain the current position of each mini vehicle of the set of mini vehicles obtained at operation 330 and generate control commands to move the respective mini vehicle to its corresponding attach point. In scenarios where manual intervention is required, the computer system 202 may provide real-time alignment instructions to an operator for moving each mini vehicle of the set of mini vehicles obtained at operation 330 to its corresponding attach point. Additionally, or optionally, where alignment issues occur with a mini vehicle, the computer system 202 may prompt such a mini vehicle of the obtained set of mini vehicles to adjust its position through suitable correction maneuvers. In various embodiments, the computer system 202 may alert the operator to take corrective actions for aligning such a mini vehicle of the obtained set of mini vehicles.

The process for container relocation 262 also includes at operation 336, controlling the motion of each mini vehicle of the set of aligned mini vehicles based on a corresponding individual trajectory. For example, the computer system 202 may direct each mini vehicle of the set of aligned mini vehicles to perform movement in accordance with its trajectory. In this regard, the computer system 202 may generate control commands or instruct a local controller of each mini vehicle of the set of aligned mini vehicles to generate such control commands to move the corresponding mini vehicle. In various embodiments, the movement of each mini vehicle of the set of aligned mini vehicles may be controlled in relation to the movement of the rest of the mini vehicles in the set of aligned mini vehicles. Towards this end, the computer system 202 may implement swarm control techniques to control the movement of the mini vehicles of the set of aligned mini vehicles. The control commands may specify the speed, direction, and stopping point(s) of each mini vehicle of the set of aligned mini vehicles so that the mini vehicles of the set of aligned mini vehicles move in a synchronized manner while jointly lifting the container to ensure the container is moved smoothly and safely from the carrier vehicle to the transportation vehicle. If the transfer takes place over a long distance or rough terrain, such as a ramp or uneven surface, the computer system 202 may variably adjust the speed or trajectories of some or all of the mini vehicles of the set of aligned mini vehicles. Additionally, where the computer system 202 detects an anomaly with regards to the mobility of any mini vehicle of the set of aligned mini vehicles (for example, a mini vehicle is deviating from its path or that an obstacle is encountered on the individual trajectory), the computer system 202 may automatically reroute such a mini vehicle of the set of aligned mini vehicles, halt all the mini vehicles of the set of aligned mini vehicles, or slow down the mini vehicles of the set of aligned mini vehicles.

In various embodiments, during the movement of the container from the carrier vehicle to the transportation vehicle, the computer system 202 may dynamically monitor one or more conditions to detect an anomaly associated with the mobility of a mini vehicle of the set of aligned mini vehicles, if it occurs. This may also involve dynamic adjustments based on real-time sensor data. For example, temperature sensors may detect that certain parts of the mini vehicles of the set of aligned mini vehicles are heating up due to increased friction or load, prompting a reduction in speed. Similarly, if a mini vehicle's battery is running low, the computer system 202 may redirect such a mini vehicle to a charging station, swapping the mini vehicle out with a fully charged one to ensure continuous operation. The computer system 202 may also log the transfer progress, updating a transfer log database for future reference or system optimization which is explained in detailed FIG. 3A. In various embodiments, multiple mini vehicles of the set of aligned mini vehicles may work in tandem for larger containers, while for smaller or less complex operations, a single mini vehicle may be used.

Figure 3A:
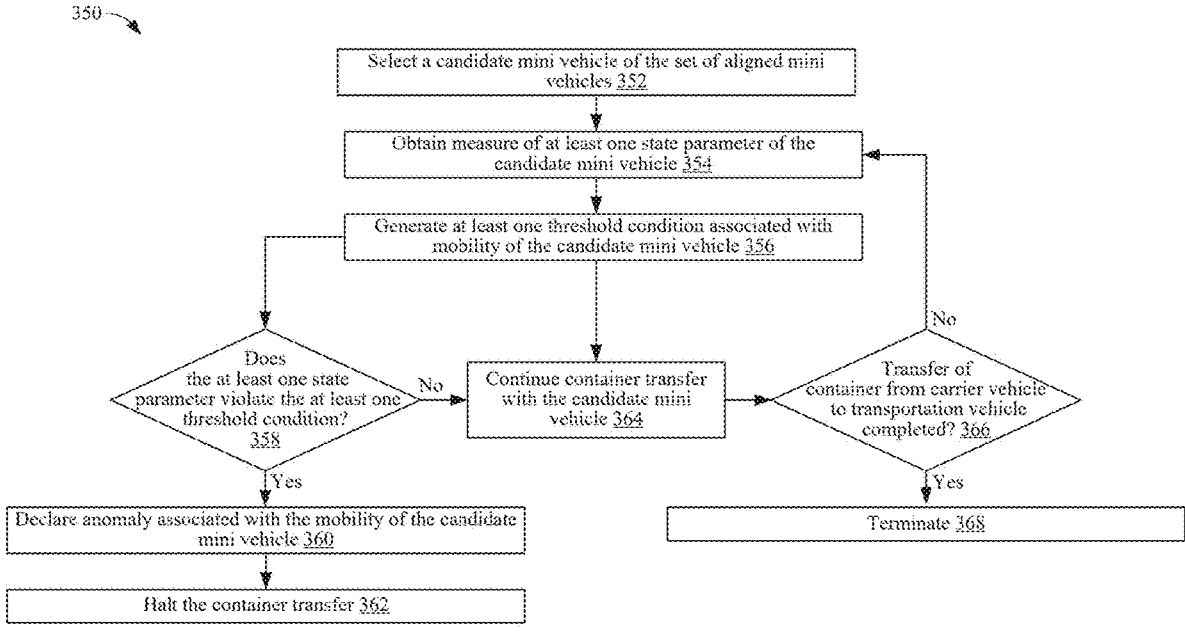
FIG. 3A is a diagram that illustrates a flowchart of a process for anomaly detection in the framework of FIG. 2B, in accordance with an embodiment of the disclosure.

FIG. 3A is a diagram that illustrates a flowchart of a process for anomaly detection 350 in the framework 250 of FIG. 2B, in accordance with an embodiment of the disclosure. FIG. 3A is explained in conjunction with elements from FIG. 1-2G. With reference to FIG. 3A there is shown a block diagram of a process for anomaly detection 350 that illustrates exemplary operations from 352-368, as described herein. The exemplary operations illustrated in the block diagram of the process for anomaly detection 350 may be performed by any computing system, apparatus, or device, such as by the computer 102 of FIG. 1 or the computer system 202 of FIG. 2A. Although illustrated with discrete blocks, the exemplary operations associated with one or more blocks of the process for anomaly detection 350 may be divided into additional blocks, combined into fewer blocks, or eliminated, depending on the particular implementation.

The process for anomaly detection 350 may be executed in a sequential or parallel manner for each mini vehicle of the set of aligned mini vehicles outputted at operation 334 of FIG. 2G. That is, the computer system 202 may execute a plurality of instances of the process for anomaly detection 350 with one instance for each mini vehicle of the set of aligned mini vehicles. In this regard, the process for anomaly detection 350 includes at operation 352, selecting a candidate mini vehicle of the set of aligned mini vehicles.

The process for anomaly detection 350 also includes at operation 354, obtaining a measure of at least one state parameter of the candidate mini vehicle. The at least one state parameter may include parameters governing the mobility of the candidate mini vehicle. For example, the at least one state parameter may include the battery charge level of the candidate mini vehicle, a temperature of at least one component of the candidate mini vehicle, a speed of the candidate mini vehicle, an orientation of the candidate mini vehicle, a position of the candidate mini vehicle, a loaded weight of the candidate mini vehicle, and the like. Such state parameters also define the operational health of the candidate mini vehicle and therefore have an impact on the mobility of the candidate mini vehicle. In various embodiments, the measures of at least some of the state parameters may be obtained from a suitable repository such as the mini vehicle database 214. Alternately, in various embodiments, the measures of at least some of the state parameters may be dynamically obtained from one or more sensors or measurement devices.

The process for anomaly detection 350 also includes at operation 356, generating at least one threshold condition associated with the mobility of the candidate mini vehicle. The threshold condition may be generated based on the evaluation of one or more conditions pertaining to a static equilibrium of the container, dynamic equilibrium of the container, static equilibrium of the candidate mini vehicle, dynamic equilibrium of the candidate mini vehicle, structural breakdown of the candidate mini vehicle, operational breakdown of the candidate mini vehicle. Additionally, in various embodiments, the threshold condition may be generated corresponding to the at least one state parameter governing the mobility of the candidate mini vehicle. For example, the computer system 202 may generate a threshold condition corresponding to at least one of a battery level of the candidate mini vehicle, a battery drainage rate of the candidate mini vehicle, a speed of the candidate mini vehicle, a load carrying capacity of the candidate mini vehicle, a temperature of one or more components of the candidate mini vehicle, a noise level of sound produced during operation by one or more components of the candidate mini vehicle, and the like. As an example, the computer system 202 obtains a load carrying capacity of a candidate mini vehicle and generates a threshold condition for the maximum load on the candidate mini vehicle as 90% of the load carrying capacity. As an additional example, the computer system 202 obtains a power consumption of a drivetrain of a candidate mini vehicle and generates a threshold condition for the rate of drain of the battery of the candidate mini vehicle, based on the power consumption of the drivetrain. Such threshold conditions represent the acceptable operational limits for the set of aligned mini vehicles, which help determine if they are fit to continue the transfer process. In various embodiments, the thresholds may either be predefined based on manufacturer specifications, historical data, or safety standards, or they may be dynamically set based on real-time conditions. For instance, a predefined threshold may require each mini vehicle of the set of aligned mini vehicles to maintain a battery charge above 20%, operate within a temperature range of 0° C. to 55° C., or travel at speeds no greater than 20 cm/s. Additionally, or alternately, a dynamic threshold may be adjusted based on factors like ambient temperature, workload, or the specific requirements of the container being transferred.

The process for anomaly detection 350 also includes at operation 358, checking if the measure of at least one state parameter obtained at operation 354 violates the at least one threshold condition generated at operation 356. In this regard, the computer system 202 evaluates whether the measure of the at least one state parameter falls within the established limits defined by the corresponding threshold condition. If the outcome of the check at operation 358 is a yes (for e.g., the measure of the at least one state parameter does violate the at least one threshold condition), the flow of the process for anomaly detection 350 proceeds to operation 360. However, if the outcome of the check at operation 358 is a no (for e.g., the measure of the at least one parameter does not violate the at least one threshold condition), the flow of the process for anomaly detection 350 proceeds to operation 364.

The process for anomaly detection 350 includes at operation 360, declaring an anomaly associated with the mobility of the candidate mini vehicle. The computer system 202 may render one or more alarms in this regard in any suitable form including audio, video, audiovisual, haptic, or the like. The process for anomaly detection 350 also includes at operation 362, halting the container transfer till the anomaly is resolved. In this regard, the computer system 202 may stop the movement of all mini vehicles of the set of aligned mini vehicles or control them to return to a safe position. In various embodiments, the computer system 202 may implement one or more damage control measures including deploying at least one emergency responder mini vehicle to replace the candidate mini vehicle for which the anomaly has been declared. Still further, in various embodiments, the computer system 202 may control container handling machines such as cranes to take over the container transfer from the set of aligned mini vehicles.

However, as discussed, if the measure of the at least one state parameter does not violate the at least one threshold condition, the transfer of the container proceeds till completion in accordance with the movement of the set of aligned mini vehicles. In such embodiments, the process for anomaly detection 350 includes at operation 364, continuing the container transfer with the candidate mini vehicle. The process for anomaly detection 350 also includes at operation 366, checking if the transfer of the container from carrier vehicle to transportation vehicle completed. If the outcome of the check at operation 366 is a yes, the process for anomaly detection 350 is terminated at operation 368. However, if the outcome of the check at operation 366 is a no, the process for anomaly detection 350 returns to operation 354 to continue monitoring the measure of the at least one state parameter of the candidate mini vehicle, and the operations 354, 356, 358, 360, and 362 or the operations 354, 356, 358, 364, 366, and 368 are repeated as the case may be.

FIG. 3B is a diagram that illustrates a flowchart of an exemplary method 370 for the automated transfer of containers for multimodal transportation, in accordance with an embodiment of the disclosure. FIG. 3B is explained in conjunction with elements from FIGS. 1-3A. With reference to FIG. 3B there is shown a block diagram of a method 370 for automated transfer of containers for multimodal transportation that illustrates exemplary operations from 372-384, as described herein.

The method 370 includes at 372, obtaining first attribute data of a transportation vehicle, second attribute data of a container on a carrier vehicle, first position data of the transportation vehicle, and second position data of the carrier vehicle. At least some of the data collected is used to authenticate the transportation vehicle, ensuring that the transportation vehicle is authorized to conduct the container transfer. The first attribute data of the transportation vehicle may include information such as vehicle ID, registration number, type, capacity, and health status (e.g., battery levels, operational condition) of the transportation vehicle. This data may be collected through onboard sensors, GPS systems, or vehicle management systems, and may be stored either locally on the vehicle's onboard computer or in a centralized database accessible via a network. The second attribute data of the container include specifics about the container being transferred, such as its size, weight, contents, and any environmental conditions (e.g., temperature, humidity) that may impact its transport. This data may be gathered using sensors attached to the container or through RFID tags, barcodes, or suitable identification systems, allowing for real-time tracking and monitoring. The first and second position data are obtained via GPS, motion sensors, or suitable position-tracking systems to track the precise location of both the transportation vehicle and the carrier vehicle. This positional data is used for accurate alignment.

The method 370 also includes at 374, authenticating the transportation vehicle for container transfer. The first attribute data in the data collected at 372 is used to authenticate the transportation vehicle for the container transfer, ensuring that the transportation vehicle is authorized and satisfies the requirements for performing the task based on its attributes and current operational state. This operation involves verifying the transportation vehicle's identity and its capability to manage the transfer of the container. The computer system 202 compares the vehicle's first attribute data against a database that contains authorized vehicles for the transfer. This comparison may involve checking the vehicle's registration, capacity to manage the load, or whether the vehicle meets the safety and regulatory standards required for the transfer. If the transportation vehicle passes the authentication checks, the transportation vehicle is cleared to proceed with the container transfer. If the vehicle fails the authentication (e.g., the vehicle does not meet the required criteria), the vehicle is flagged, and the system may prevent the vehicle from participating in the transfer operation.

The method 370 also includes at 376, generating control commands based on the first and second position data of the transportation vehicle and the carrier vehicle, respectively. The first and second position data allows the system to understand the precise location and alignment of the transportation vehicle and the carrier vehicle in relation to each other. This data is used for determining the movement path and ensuring that the transportation vehicle is properly aligned for the container transfer. The control commands are generated to guide the transportation vehicle and the carrier vehicle to align with each other accurately. This may involve adjusting the speed, angle, or orientation of the transportation vehicle and the carrier vehicle.

The method 370 also includes at 378, generating a transfer trajectory between the carrier vehicle and the transportation vehicle based on the first position data and the second position data. This transfer trajectory represents the path along which the container will be moved from the carrier vehicle to the transportation vehicle. The transfer trajectory is created by taking into account the first position data of the transportation vehicle and the second position data of the carrier vehicle, along with the container's size, weight, and various relevant characteristics. The transfer trajectory ensures that the container is moved along a predefined route, avoiding any obstacles or misalignments that may potentially hinder the transfer.

The method 370 also includes at 380, controlling an electromechanical platform to movably extend in a space between the carrier vehicle and the transportation vehicle that facilitates the movement of the container. The electromechanical platform is extended in the space between the two vehicles, creating a secure and stable path for the container to be transferred. This platform may be equipped with various mechanisms, such as electric motors, tracks, or robotic arms, which allow the platform to adjust its position, height, and orientation as needed to align with both the carrier and transportation vehicles.

The method 370 also includes at 382, identifying a set of mini vehicles from a plurality of mini vehicles based on the second attribute data of the container. The identification or selection of the mini vehicles is based on the second attribute data of the container, such as its size, weight, and handling requirements. The computer system 202 evaluates the capacity and compatibility of each mini vehicle to determine which ones are best suited for the task. The number of mini vehicles selected may depend on the container's specifications and the overall complexity of the transfer.

The method 370 also includes at 384, controlling each mini vehicle of the set of mini vehicles to move the container from the carrier vehicle to the transportation vehicle along the electromechanical platform, based on the transfer trajectory. Each mini vehicle of the set of mini vehicles is directed along a corresponding individual trajectory that aligns with the transfer trajectory, ensuring that the container is moved in a coordinated manner. The computer system 202 may generate individual trajectories for each mini vehicle of the set of mini vehicles based on their respective positions and the container's attributes. These trajectories help guide the mini vehicles of the set of mini vehicles to move the container in a synchronized fashion. The movement of the mini vehicles of the set of mini vehicles is continuously monitored and adjusted as needed.

Figure 4A:
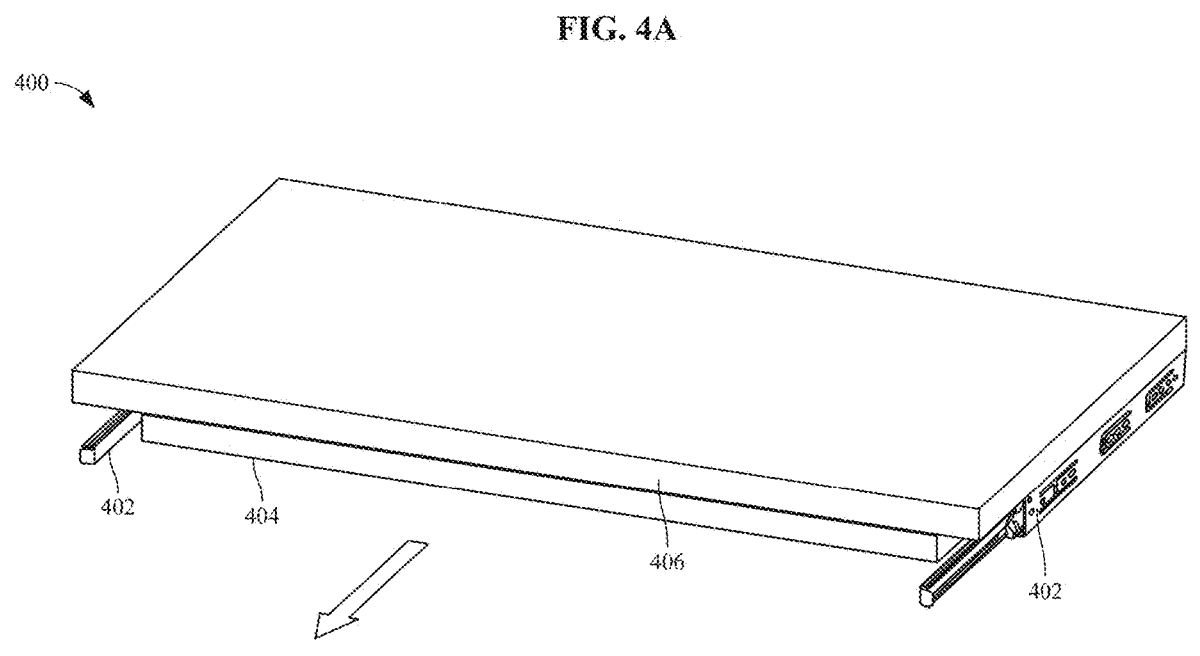

FIG. 4A is a diagram that illustrates an electromechanical platform movably coupled with the base of a carrier vehicle, in accordance with an embodiment of the disclosure. FIG. 4A is explained in conjunction with elements from FIGS. 1-3B. In FIG. 4A, the environment 400 refers to the overall setup in which the electromechanical platform 404 operates for the automated transfer of containers. The environment 400 encompasses the electromechanical platform 404 and the supporting infrastructure. Within this environment 400, the electromechanical platform 404 is integrated with the container base 406 of the carrier vehicle. The container base serves as the structural foundation for the platform on which the container is held.

The electromechanical platform 404 may be mounted on the sliding rails 402, which guide and support its movement along a first dimension. These rails provide the means for the platform to extend and retract along the first dimension, enabling precise positioning of the platform between the carrier vehicle and the transportation vehicle. The sliding rails 402 are designed to ensure smooth and stable movement, preventing any unintended shifts that may disrupt the container transfer process. In various embodiments, the electromechanical platform 404 is not intended to be limited to sliding along these sliding rails 402; instead, or additionally, the electromechanical platform may be movable in different dimensions and directions using suitable mechanisms. For example, the electromechanical platform 404 may be movable at various angles with respect to the first dimension depending on the design and the specific needs of the container transfer operation.

The material of the electromechanical platform 404 is carefully selected to balance weight, strength, and durability. Common materials include lightweight alloys such as aluminium, which provide the required strength to manage heavy containers without adding redundant weight that may affect the overall efficiency of the system. Various materials like steel or composite materials may also be used, depending on the specific requirements for strength, resistance to wear, and durability in various environments. These materials are designed to withstand the stresses and strains associated with the automated transfer process, including vibrations, heavy loads, and environmental factors such as temperature fluctuations or exposure to corrosive elements. The container base 406 of the carrier vehicle aids in anchoring the electromechanical platform 404 and facilitating its movement. It integrates with the rest of the carrier vehicle's systems, ensuring that the platform operates in co-ordination with the overall vehicle operation. The electromechanical platform 404 may be equipped with motors, actuators, and sensors that control the movement of the platform along the sliding rails 402, adjusting its position. The sliding rails 402 allow the platform to adjust its position precisely, to align with the transportation vehicle, or to move the container horizontally or vertically.

Figure 4B:
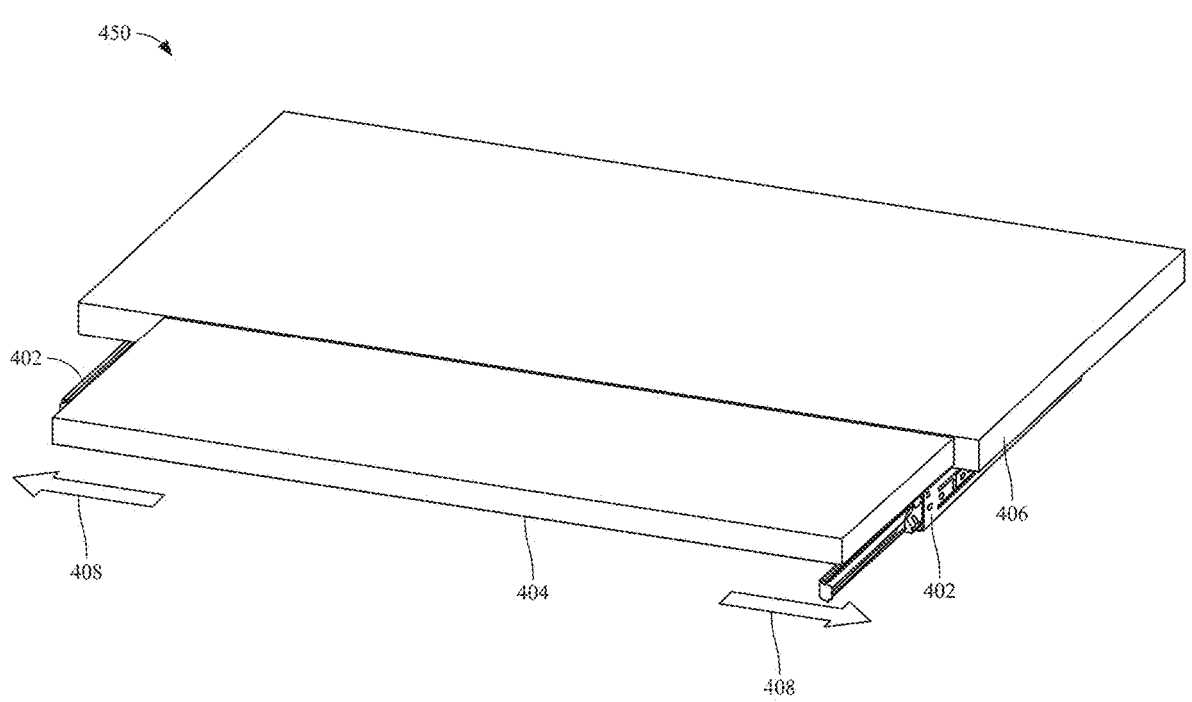
FIG. 4B is a diagram that illustrates the electromechanical platform of FIG. 4A in an extended configuration from the base of the carrier vehicle, in accordance with an embodiment of the disclosure.

FIG. 4B is a diagram 450 that illustrates the electromechanical platform 404 in an extended configuration from the container base 406 of the carrier vehicle, in accordance with an embodiment of the disclosure. FIG. 4B is explained in conjunction with elements from FIGS. 1-4A. While FIG. 4A primarily shows the electromechanical platform 404 mounted on sliding rails 402, FIG. 4B provides an additional perspective on the interaction of the electromechanical platform 404 with the container base 406. In FIG. 4B, the electromechanical platform 404 is configured to slide along a second dimension orthogonal to the first dimension in a controlled manner along the rails, as indicated by the directional arrows 408. Such motion ensures that the electromechanical platform 404 may move containers from the carrier vehicle to the transportation vehicle with precise alignment. The platform's movement is powered by a system integrated into the rails, enabling the electromechanical platform to extend or retract smoothly along the axis of the first dimension. Thus, the electromechanical platform 404 can slide along the sliding rails 402, to extend in a forward direction (in the first dimension) and then attach to the side base of the carrier vehicle. In various embodiments, the electromechanical platform 404 may be able to move along a direction orthogonal to both the first dimension and the second dimension to adjust its height according to the height of the transportation vehicle. This ensures that the electromechanical platform 404 reaches the appropriate position for transferring the container to the transportation vehicle.

Figure 5:
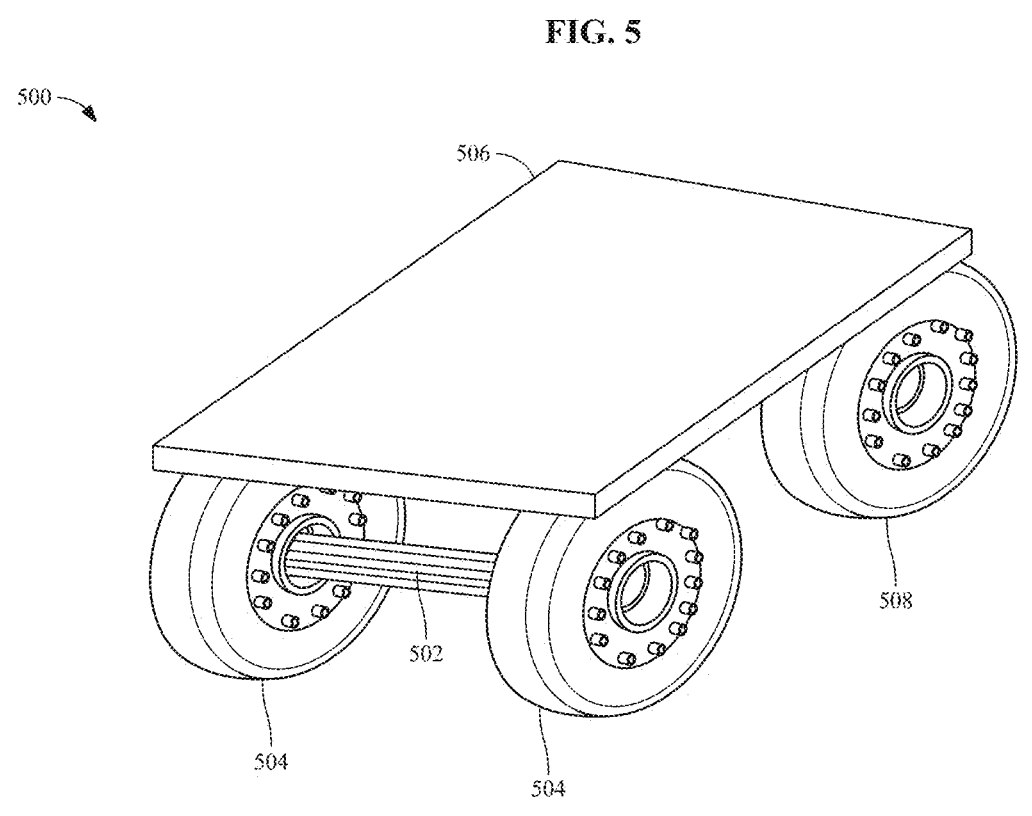

FIG. 5 is a diagram that illustrates a perspective view of a mini vehicle 500 used for the automated transfer of containers, in accordance with an embodiment of the disclosure. FIG. 5 is explained in conjunction with elements from FIG. 1-4B. FIG. 5 illustrates a mini vehicle 500 of the plurality of mini vehicles 216 of FIG. 2A designed for the automated transfer of containers, offering a detailed view of its components and their potential functionalities. The mini vehicle 500 features a pair of front wheels 504 and back wheels 508, both equipped with omnidirectional movement abilities. These wheels may be implemented as Mecanum wheels or omni-wheels and allow the mini vehicle 500 to move in any direction without needing to turn. These wheels allow the mini vehicle 500 to move in any direction forward, backward, laterally, or even diagonally without requiring rotation, providing high maneuverability. This characteristic provides unparalleled maneuverability, making the mini vehicle 500 highly suitable for navigating tight or crowded spaces, such as those found in logistics hubs or vehicle loading bays. Between the front and back wheels, a structural component 502, which may function as a rod, chassis support, or stabilizing bar, is shown. This element ensures proper alignment and stability of the wheels while also contributing to the structural integrity of the vehicle. The placement and design of the structural component 502 may vary based on the operational requirements. For instance, the mini vehicle 500 may house power transmission systems, such as belts or drive shafts, or even support sensor arrays for tracking and alignment. The chassis or rod used between the wheels may be made from lightweight but durable materials such as aluminium alloys or composite materials to ensure strength while minimizing the overall weight.

The platform 506, on the top of the mini vehicle 500, serves as the primary surface for carrying containers. The platform 506 is robust and stable, designed to accommodate varying container sizes and weights. Beyond its simple load-bearing function, the platform 506 may incorporate advanced mechanisms to enhance functionality. For example, the platform 506 may include a scissor-lift mechanism that allows it to vertically raise or lower the container for precise placement or stacking. Such mechanisms may be particularly useful in scenarios where containers need to be loaded onto racks or elevated surfaces. In addition to the scissor lift, various enhancements to the mini vehicle 500 are also possible. For instance, the platform 506 may include an interlocking system, such as a rod or square-shaped fixture in the middle of the platform 506, designed to securely connect with corresponding features on the container. If the container is equipped with a compatible slot or attachment point, this configuration may allow for a secure "lock-and-key" style fit, preventing the container from shifting during transit. Such interlocking mechanisms may be especially beneficial for handling fragile or high-value cargo.

The front wheels 504 and back wheels 508 are connected via a rod or an axle system that ensures synchronized movement and stability during operation. Each wheel of the front wheels 504 and back wheels 508 is powered by at least one motor, or a different suitable transmission mechanism, enabling precise control and autonomous navigation. The mini vehicle 500 may be equipped with an array of sensors, including position-tracking sensors, LiDAR for obstacle detection, acoustic sensors for anomaly detection, and load sensors to monitor the weight distribution of the container. The design of the mini vehicle 500 is highly modular, allowing for customization based on specific needs. For example, the size and load capacity of the mini vehicle 500 may be scaled up or down to manage different types of containers. The platform 506 may also include extendable arms or clamps for additional container stability, or even rollers to facilitate smooth loading and unloading. In terms of operational versatility, the mini vehicle 500 may be configured for various tasks. The mini vehicle 500 may be designed to work collaboratively with various mini vehicles, using communication systems like Wi-Fi or Bluetooth for coordinated movements. For instance, multiple mini vehicles may collectively lift and transport a larger or heavier container that satisfies the capacity of a single unit. Moreover, the mini vehicle 500 may include a rechargeable battery system with swappable packs to ensure continuous operation in high-demand environments.

The overall design of the mini vehicle 500 may be lightweight yet durable, often constructed from materials like aluminium alloys or composite materials. This ensures that the mini vehicle 500 is energy-efficient and meets the requirements for handling rigorous operational demands. Additionally, the mini vehicle 500 may be equipped with anti-slip coatings on the surface of the platform 506 or even heating elements to prevent freezing in cold environments.

Figure 6:
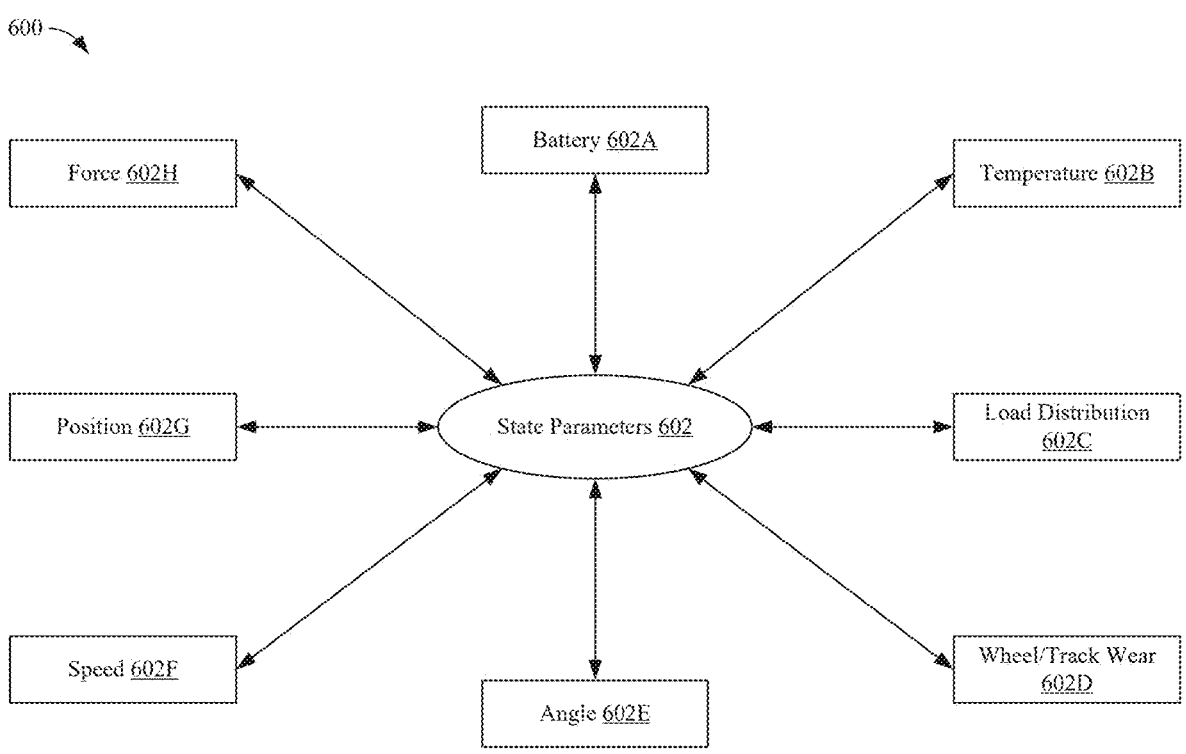
FIG. 6 is a diagram that illustrates state parameters of the mini vehicle of FIG. 5, in accordance with an embodiment of the disclosure.

FIG. 6 is a diagram 600 that illustrates some examples of state parameters 602 of the mini vehicle 500 of FIG. 5, in accordance with an embodiment of the disclosure. FIG. 6 is explained in conjunction with elements from FIGS. 1-5. Once the appropriate set of mini vehicles is identified, their control is refined through continuous feedback obtained in relation to the state parameters, such as battery status, load distribution, speed, position so on. For example, a mini vehicle of the set of aligned mini vehicles that has a low battery level may operate at reduced efficiency or require a different allocation to avoid mid-transfer interruptions. Similarly, monitoring parameters like wheel wear or force exerted ensures that each mini vehicle of the set of aligned mini vehicles operates within its mechanical limits. The control of the set of aligned mini vehicles progresses to their synchronized motion. Each mini vehicle of the set of aligned mini vehicles follows its assigned trajectory while the computer system 202 continuously monitors its performance through one or more state parameters. Real-time feedback from sensors ensures that any deviations from the planned trajectory are corrected immediately. For instance, if a mini vehicle of the set of aligned mini vehicles encounters unexpected resistance or an obstacle, adjustments are made to its speed or direction to maintain overall coordination.

FIG. 6 illustrates some examples of the state parameters 602 such as a battery 602A, a temperature 602B, a load distribution 602C, a wheel/track wear 602D, an angle 602E, a speed 602F, a position 602G, and a force 602H. Each mini vehicle of the set of aligned mini vehicles is charged before commencing the transfer operations, as maintaining sufficient charge is optimal for uninterrupted performance. The battery 602A is one of the state parameters that monitor the energy levels of each mini vehicle of the set of aligned mini vehicles. This ensures that mini vehicles of the set of aligned mini vehicles with inadequate energy do not compromise the synchronized transfer of containers. In certain implementations, battery health indicators, such as charge cycles or temperature, are also tracked to predict maintenance needs. For example, a mini vehicle of the set of aligned mini vehicles with a low battery may be reassigned to a less demanding role or removed from the active set for recharging. The system may also stagger charging schedules to ensure that a sufficient number of mini vehicles remain operational.

Temperature 602B is also one of the state parameters that ensures that the mini vehicles of the set of aligned mini vehicles operate within their thermal limits. Excessive heat may indicate motor strain, electrical issues, or environmental challenges such as high ambient temperatures. For instance, if a mini vehicle's components are overheating during operation, the computer system 202 may stop the transfer of container and may keep that particular mini vehicle aside. Additionally, the computer system 202 may assist in reducing the load of the container, adjust the speed of such a mini vehicle, or temporarily halt the operations of all the mini vehicles of the set of aligned mini vehicles. This prevents damage to such an underperforming mini vehicle.

Load distribution 602C is also one of the state parameters that ensures that the weight of a container is evenly and appropriately shared among the mini vehicles in the set of aligned mini vehicles. Each mini vehicle of the set of aligned mini vehicles has a predefined load capacity, which, if exceeded, may lead to serious operational failures. Overloading a mini vehicle beyond its loading capacity may cause mechanical strain, reduced maneuverability, or even permanent damage to its components. Uneven distribution of weight across the mini vehicles of the set of aligned mini vehicles may also result in instability during movement, increasing the risk of tipping or misalignment. For instance, consider a container weighing 2,000 kilograms that needs to be transported using five mini vehicles. The container's weight is unevenly distributed, with a first end weighing 1,200 kilograms and a second end weighing 800 kilograms. If each mini vehicle of the set of aligned mini vehicles is rated to carry a maximum load of 500 kilograms, the computer system 202 must strategically assign mini vehicles of the set of aligned mini vehicles for safe and balanced handling of the heavier section of the container (1,200 kilograms) may be assigned three mini vehicles, with each vehicle carrying 400 kilograms, staying well within their load capacity. The lighter section (800 kilograms) may be managed by two mini vehicles, each carrying 400 kilograms. If the computer system 202 fails to calculate and adjust the distribution, one of the mini vehicles catering to the heavier section may end up bearing a load greater than its capacity of 500 kilograms. This may result in the stalling of such a mini vehicle, tipping over of such a mini vehicle, or damaging the motors or wheels of such a mini vehicle. Additionally, such instability may cause the container to shift unexpectedly, risking damage to the container, the mini vehicles, or surrounding equipment. To prevent such scenarios, the computer system 202 or a control system of the set of aligned mini vehicles continuously monitors load distribution in real-time. Sensors on each mini vehicle track the weight being carried, and adjustments are made dynamically. For example, if one mini vehicle detects an excessive load due to an unexpected weight shift during movement, the computer system 202 may reduce the speed of the mini vehicle to maintain stability while redistributing the load to various mini vehicles. In extreme cases, if redistribution is not feasible, the operation may be paused, and additional mini vehicles may be deployed to share the load.

Wheel/Track Wear 602D of the mini vehicles of the set of aligned mini vehicles play a vital role in ensuring smooth mobility. The of the set of aligned mini vehicles may be equipped with various types of wheels or tracks depending on their operational environment such as steel or iron wheels, and rubber tires. The steel or iron wheels may become rusted after certain uses and the computer system 202 selects the mini vehicles of the set of aligned mini vehicles which are not rusted. The condition of wheels or tracks directly affects the traction and maneuverability of the mini vehicles of the set of aligned mini vehicles. Tracking wear levels helps identify mini vehicles that may require maintenance. Similarly, a worn-out wheel may reduce traction, causing the mini vehicle to slip during operation or struggle to climb inclines. The computer system 202 monitors the condition of wheels and tracks using integrated sensors. If excessive wear is detected, the mini vehicle is flagged for maintenance.

The angle 602E as a state parameter refers to the tilt or orientation of each mini vehicle in the set of aligned mini vehicles during container handling and movement. Maintaining an appropriate angle for each mini vehicle of the set of aligned mini vehicles provides stability, especially when mini vehicles operate on inclined surfaces, uneven terrain, or while navigating sharp turns. An excessive tilt may result in instability, risking container tipping or misalignment with transfer platforms, leading to operational delays or damage to the container or mini vehicle. Consider a scenario where a mini vehicle of the set of aligned mini vehicles is transporting a container across a loading dock with a slight incline. The computer system 202 uses gyroscopic sensors to monitor the tilt. If the mini vehicle begins to tilt excessively forward or backward due to the weight of the container, the computer system 202 may adjust the mini vehicle's speed or braking to reduce the tilt or reassign some of the load to a different mini vehicle of the set of aligned mini vehicles to balance the weight distribution. While navigating tight corners, the computer system 202 monitors lateral tilt of a mini vehicle of the set of aligned mini vehicles to ensure the container remains stable. For example, if a mini vehicle carrying a heavy container begins to tilt sideways, the computer system 202 may alert nearby mini vehicles to adjust their positions and avoid potential collisions. Containers with a high center of gravity are more prone to causing mini vehicles to tip over. The computer system 202 calculates the center of gravity based on container dimensions and weight distribution, ensuring that the mini vehicles maintain a safe tilt angle. For instance, if a tall container is being moved on a sloped surface, the computer system 202 may direct the set of aligned mini vehicles to ascend or descend at a controlled speed, minimizing the risk of toppling. The angle 602E may be used by the computer system 202 in conjunction with various state parameters such as load distribution 602C, position 602G, and force 602H.

The speed 602F as a state parameter ensures the safe, efficient, and coordinated operation of the set of aligned mini vehicles during container transfer. Speed control is used for maintaining the integrity of the load as well as for preventing accidents and ensuring synchronization. The speed 602F is monitored and adjusted dynamically based on real-time data, environmental conditions, and the specific tasks assigned to each mini vehicle of the set of aligned mini vehicles. The mini vehicles of the set of aligned mini vehicles carrying containers need to operate at controlled speeds to avoid sudden shifts in the load's center of gravity. Excessive speed, especially during turns or on uneven surfaces, may lead to instability, tipping, or misalignment of the set of aligned mini vehicles. For example, a mini vehicle carrying a tall or heavy container must move at a slower speed to ensure the load remains balanced and securely positioned during transit. The computer system 202 uses proximity sensors and real-time position tracking to regulate speed, slowing down the set of aligned mini vehicles when they approach obstacles. Proportional-Integral-Derivative (PID) controllers continuously monitor speed and make fine adjustments to ensure that the set of aligned mini vehicles maintain desired velocity profiles. Machine learning algorithms such as reinforcement learning models analyze historical data and optimize speed for various tasks. Sensors such as encoders, accelerometers, and gyroscopes provide continuous feedback on speed and movement of the set of aligned mini vehicles. In environments with wet or slippery surfaces, the computer system 202 reduces the speed of the set of aligned mini vehicles to prevent skidding. Speed regulation also impacts energy consumption. Excessive speeds may lead to higher energy use. The computer system 202 may incorporate emergency braking mechanisms that may bring a mini vehicle to an immediate halt if the mini vehicle satisfies safe speed thresholds or encounters unexpected hazards.

Position 602G as a state parameter ensures precise operation of the mini vehicles of the set of aligned mini vehicles involved in the automated transfer of containers. Position 602G refers to the specific location of each mini vehicle of the set of aligned mini vehicles within the operational environment, relative to both the container and/or components such as the carrier and transportation vehicles. The computer system 202 uses advanced positioning technologies, including LiDAR (Light Detection and Ranging), and infrared sensors, to continuously track and adjust the position of the mini vehicles of the set of aligned mini vehicles in real time. In an automated system, accurate positioning ensures that the mini vehicles are aligned precisely with the container. The Position 602G also defines the alignment of the mini vehicles of the set of aligned mini vehicles relative to the container. Before the container transfer begins, the computer system 202 uses GPS data for broad positioning of the mini vehicle and LiDAR data for precise alignment, ensuring that each mini vehicle of the set of aligned mini vehicles is positioned correctly relative to the container's attach points. During the transfer process, the Position 602G is continually monitored. The computer system 202 tracks the mini vehicle's movement and updates its position using real-time data from the onboard sensors. If the mini vehicle veers off course, the computer system 202 automatically corrects its trajectory. As a mini vehicle moves toward the container, the precise positioning ensures that the mini vehicle may successfully attach to the container's designated points. For instance, a mini vehicle's positioning relative to the container's attach points determines whether the mini vehicle may securely grasp or lift the container. If the mini vehicle's position is off by just a few centimeters, the container may fail to align correctly, resulting in the need to realign or restart the process. If the computer system 202 detects that the position of the mini vehicle is not proper (e.g., the mini vehicle drifts or encounters an obstacle), the computer system 202 may use the Position 602G to automatically adjust the vehicle's path.

Force 602H as a state parameter defines the impact of any force applicable on the container by a mini vehicle during the transfer of containers. Excessive force applied during container handling may result in physical damage. For example, if the force applied while moving a delicate or sensitive container is beyond a threshold, it may cause dents, cracks, or structural damage. Containers may have fragile or sensitive items inside, such as electronics or perishable goods, which require careful handling. If the applied force satisfies a threshold, it may lead to these items being damaged. Too much force exerted by the mini vehicle may destabilize both the vehicle and the container. This may lead to tipping, misalignment, or even a complete failure in the transfer operation. For instance, if a mini vehicle applies too much force when approaching a container, it may cause the container to shift abruptly or dislodge. Applying excessive force over long periods may also lead to wear and tear on the mini vehicle's motors, wheels, and/or various components of the mini vehicle. Each mini vehicle may be equipped with force sensors that continuously measure the amount of force being exerted on the container. These sensors may detect both compressive and tensile forces (push or pull forces) that the mini vehicle applies during the transfer process. If the force satisfies a predetermined threshold, the computer system 202 immediately adjusts the mini vehicle's actions or issues a warning for maintenance and/or corrective actions. In various embodiments, the force applied may be monitored in tandem with state parameters such as the load distribution 602C, the temperature 602B, and the position 602G. For example, if a mini vehicle detects an uneven load distribution (e.g., the container is heavier on one side), the mini vehicle may adjust the force applied on that side of the mini vehicle.

Figure 7:
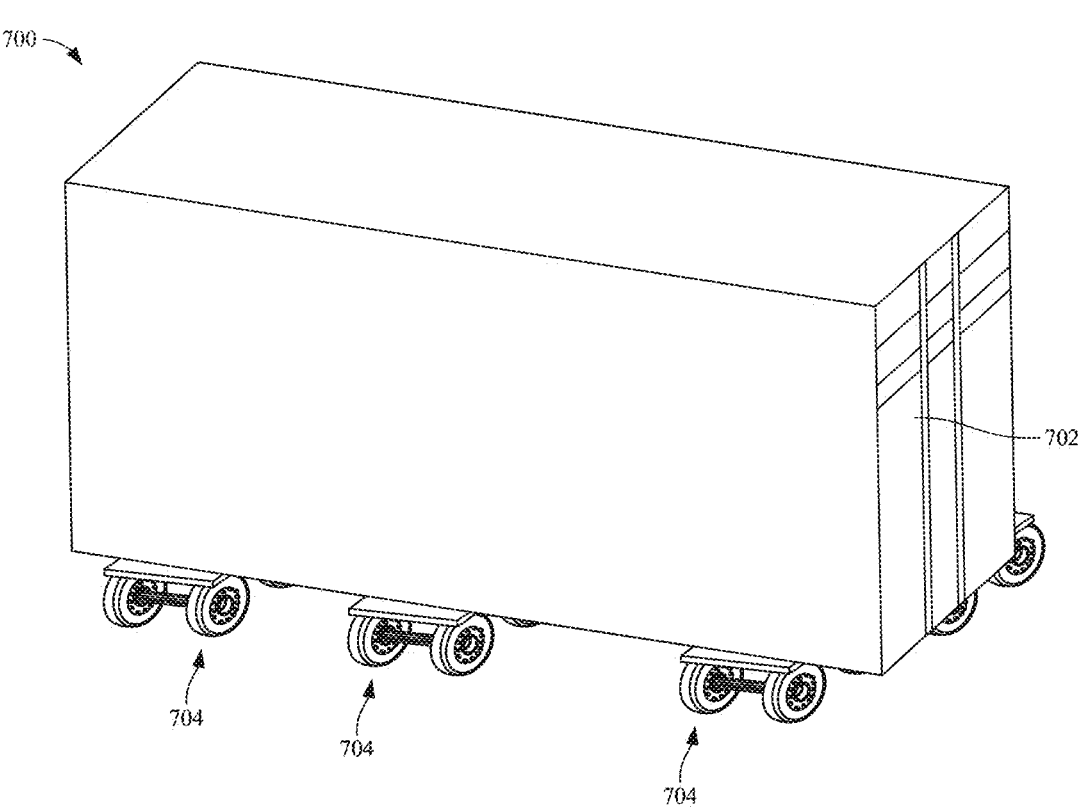
FIG. 7 is a diagram that illustrates a set of mini vehicles attached to the base of a container, in accordance with an embodiment of the disclosure.

FIG. 7 is a diagram that illustrates a set of mini vehicles 704 attached to the base of a container 702, in accordance with an embodiment of the disclosure. FIG. 7 is explained in conjunction with elements from FIGS. 1-6. FIG. 7 illustrates an environment 700 representing a dynamic operational setting where a container 702 is transported or relocated with the help of a set of mini vehicles 704. Each mini vehicle of the set of mini vehicles 704 may structurally and functionally be similar to the mini vehicle 500 of FIG. 5. The container 702 may vary in size, weight, and structural composition depending on the type of cargo it holds. The container 702 may be a standard shipping container used for multimodal transportation, a specialized container for temperature-sensitive goods such as pharmaceuticals or food, or even a reinforced container for hazardous materials. The system's flexibility allows the container to accommodate these variations seamlessly. For example, if the container is carrying fragile or hazardous goods, additional precautions, such as shock-absorbing mechanisms on the mini vehicles, may be implemented. The set of mini vehicles 704 plays a pivotal role in the container transfer process. The set of mini vehicles 704, equipped with omnidirectional wheels, offer unmatched maneuverability and precision. Depending on the size and weight of the container, the computer system 202 determines the attach points on the container where the computer system 202 may deploy a single mini vehicle or multiple vehicles of the set of mini vehicles 704 according to those attach points. For instance, a lightweight container may only require one mini vehicle to transport it, while a heavier or larger container may impose the deployment of several mini vehicles of the set of mini vehicles 704. In such cases, the mini vehicles of the set of mini vehicles 704 communicate with each other wirelessly to synchronize their movements, ensuring the load is evenly distributed.

The material type inside the container also influences the operational setup of the mini vehicles. For example, if the container holds liquids or unstable materials, the mini vehicles of the set of mini vehicles 704 may move at reduced speeds to prevent spillage or imbalance. Additionally, the computer system 202 may incorporate real-time monitoring sensors to detect shifts in the container's load during transit. For high-value or fragile goods, the mini vehicles of the set of mini vehicles 704 may be equipped with cushioning systems to absorb shocks and vibrations. Each mini vehicle of the set of mini vehicles 704, as part of environment 700, operates autonomously but may also work collaboratively. The set of mini vehicles 704 may be equipped with advanced navigation systems, such as LiDAR and position-tracking sensors, to precisely locate and align themselves beneath the container. The set of mini vehicles 704 may employ interlocking mechanisms or clamps to securely attach to the container during movement. In various embodiments, if the container 702 is extraordinarily heavy or oversized, additional mini vehicles may be summoned to assist in the transfer process. These vehicles coordinate their movements to share the load effectively. For example, two mini vehicles of the set of mini vehicles 704 may position themselves on either side of the container, while the remaining mini vehicles of the set of mini vehicles 704 support the center.

Moreover, the computer system 202 may adapt to specific environmental conditions. The environment 700 also accounts for variations in operational terrain. The set of mini vehicles 704 are designed to manage flat warehouse floors, slightly inclined ramps, and even outdoor settings with uneven surfaces. For example, in a port setting, the vehicles may need to traverse from a storage area to a docked ship. Furthermore, the integration of data analytics and real-time monitoring enhances the efficiency of the environment. The set of mini vehicles 704 continuously relay information about their status, including battery levels, load conditions, and route progress, to a central control system such as the computer system 202.

Figure 8:
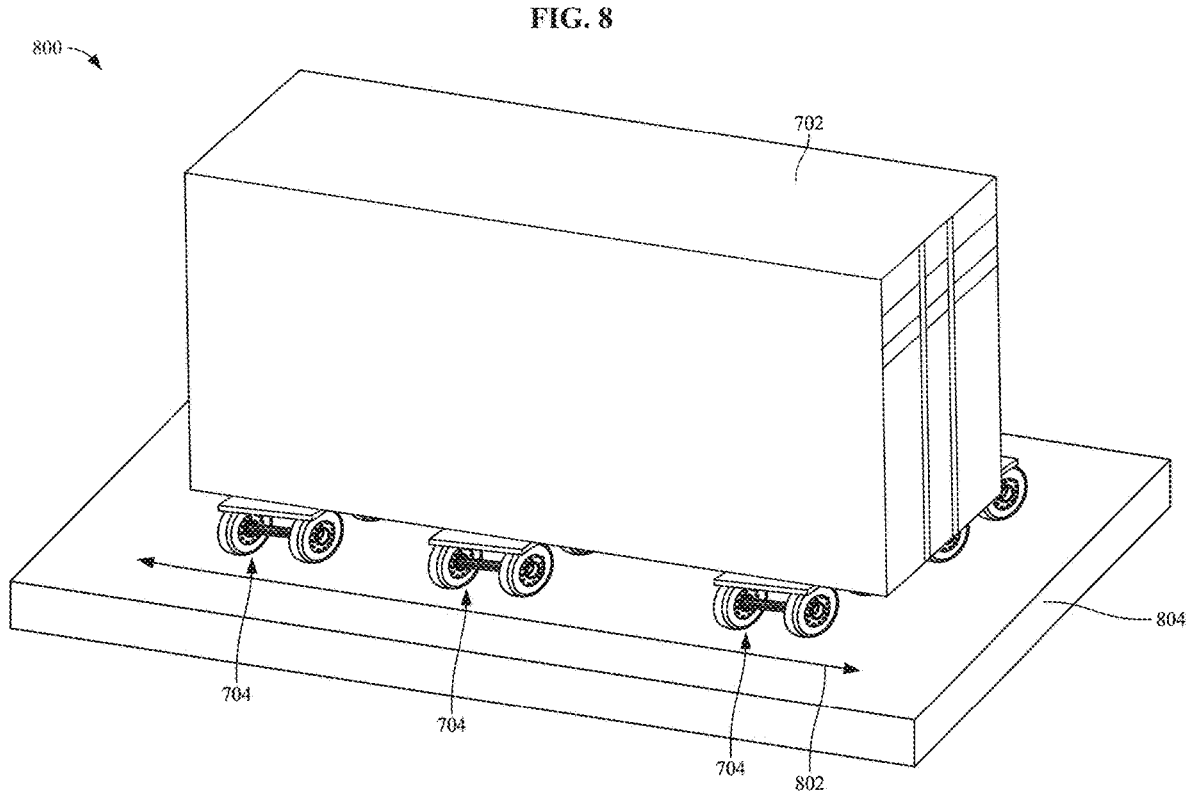
FIG. 8 is a diagram that illustrates the movement of the container along an electromechanical platform based on a transfer trajectory, in accordance with an embodiment of the disclosure.

FIG. 8 is a diagram that illustrates the movement of the container 702 along an electromechanical platform 804 based on a transfer trajectory 802, in accordance with an embodiment of the disclosure. FIG. 8 is explained in conjunction with elements from FIGS. 1-7. FIG. 8 illustrates an advanced setup for container transfer, building upon the environment 700 depicted in FIG. 7. This environment 800 integrates the container 702, the set of mini vehicles 704, an electromechanical platform 804, and a defined individual trajectory for each mini vehicle of the set of mini vehicles 704 based on the transfer trajectory 802 for the container 702. The electromechanical platform 804 acts as an intermediary surface between the starting and destination points of the container 702, such as from a carrier vehicle to a transportation vehicle. The electromechanical platform 804 may be configured to extend, retract, or adjust its height and angle to align with the container's position and the mini vehicles' paths, adapting to the operational requirements of the environment.

The individual transfer trajectory 802 represents the predefined or dynamically generated path based on the transfer trajectory that each mini vehicle of the set of mini vehicles 704 follows while moving the container 702. The individual transfer trajectory 802 is calculated based on several factors, including the positions of the carrier vehicle and transportation vehicle, the container's dimensions, and the real-time conditions of the environment, and mainly on transfer trajectory which is generated primarily. For instance, if the transfer involves navigating tight spaces or avoiding obstacles, the individual transfer trajectory 802 may incorporate smooth curves or optimized turns. The set of mini vehicles 704, as described in FIG. 7, retain their omnidirectional movement abilities and autonomous navigation systems. However, their operation is now closely guided by the transfer trajectory 802. The set of mini vehicles 704 are equipped with advanced sensors and control algorithms to ensure precise adherence to the trajectory. For example, in a scenario where the container 702 needs to be moved diagonally across the electromechanical platform 804, the transfer trajectory 802 ensures that the set of mini vehicles 704 adjust their positions and velocities are synchronized to maintain balance and prevent tilting.

The integration of the electromechanical platform 804 and the individual transfer trajectory 802 introduces several possibilities and operational enhancements. For instance, the electromechanical platform 804 may feature built-in rollers or conveyor belts to assist the set of mini vehicles 704 in initiating or completing the container movement. This reduces the workload of the set of mini vehicles 704. Additionally, the platform's material may be designed to minimize friction. For example, the surface may be coated with a low-friction polymer or equipped with anti-static materials. The system is also designed to accommodate various container transfer scenarios. For example, a single mini vehicle may follow a simple linear trajectory along the platform to transfer the small container. Alternately, multiple mini vehicles of the set of mini vehicles 704 may be deployed simultaneously, each mini vehicle adhering to its segment of the individual transfer trajectory 802, to distribute the load evenly for large or heavy containers. The electromechanical platform 804 itself introduces additional flexibility. It may extend horizontally to bridge gaps between carrier and transportation vehicles or incline to compensate for height differences. For example, in port operations, the electromechanical platform 804 may adjust to match the height of a ship's deck. The combined use of the electromechanical platform 804 and the transfer trajectory 802 also enhances safety and monitoring abilities. The computer system 202 continuously monitors the mini vehicles' adherence to the trajectory and the container's position on the electromechanical platform 804. If deviations or anomalies are detected, such as a mini vehicle moving off-track or the container shifting unexpectedly, the computer system 202 may halt operations and make adjustments to prevent damage or accidents.

Figure 9A:
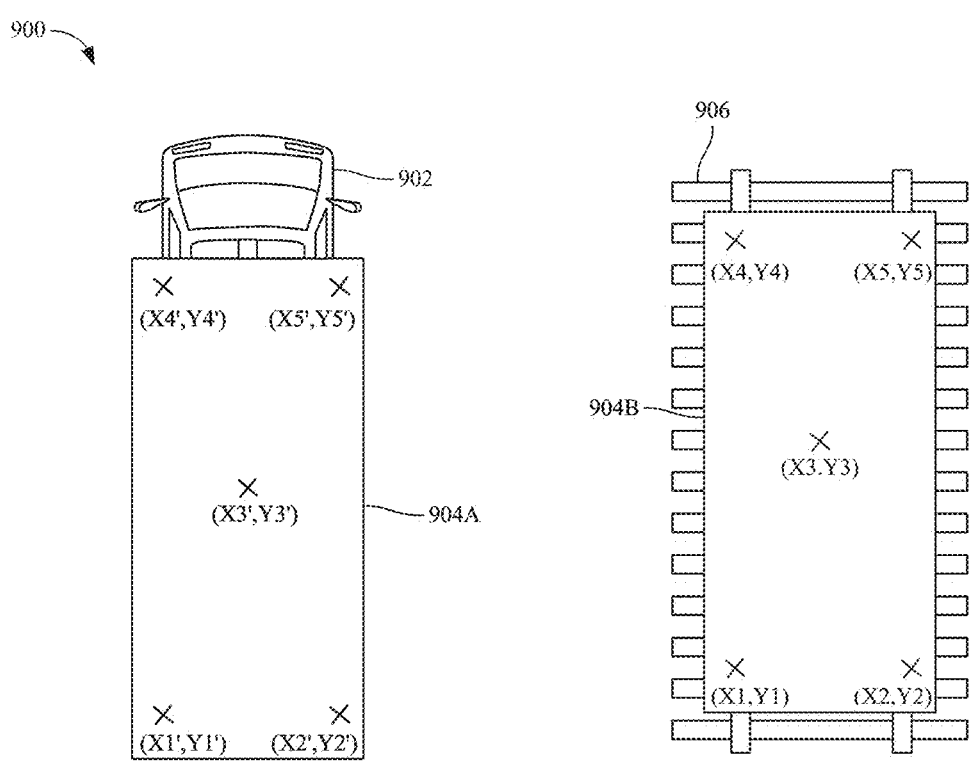
FIG. 9A is a diagram that illustrates schematics of container transfer between a train and a truck, in accordance with an embodiment of the disclosure.

FIG. 9A is a diagram that illustrates schematics of container transfer between a train and a truck, in accordance with an embodiment of the disclosure. FIG. 9A is explained in conjunction with elements from FIGS. 1-8. FIG. 9A illustrates an environment 900 illustrating the transfer of a container from a carrier vehicle, represented as a train 906, to a transportation vehicle, represented as a truck 902, in a manner that maintains the container's original axis and orientation. This environment emphasizes precision and alignment during the transfer process to ensure that the container's position on the truck mirrors its original placement on the train. The train 906, as the carrier vehicle, is equipped with a container 904B securely positioned on its flatbed or cargo space. The truck 902, as the transportation vehicle, is shown carrying the same container after the transfer of the container 904B from the train 906 to the truck 902, with a specific arrangement to demonstrate its capacity for precise container placement. Hereinafter, the container 904B when shown on the truck 902 is denoted and referred to as a container 904A. The goal is to move the container 904B from the train 906 to the truck 902 such that its original alignment and orientation remain intact. The position and alignment of the container 904B on the train 906 are defined using a coordinate system that identifies attach points on the container as (X1, Y1), (X2, Y2) at the bottom corners, (X3, Y3), (X4, Y4) at the top corners, and (X5, Y5) at the centre of the container 904B. Similarly, the position and alignment of the container 904A are defined using a coordinate system of points (X1', Y1'), (X2', Y2') at the bottom corners, (X3', Y3'), (X4', Y4') at the top corners, and (X5', Y5') at the centre of the container 904A.

During the transfer, the computer system 202 ensures that the same relative positioning of these points is maintained (e.g., points (X1, Y1) should align with points (X1', Y1') and so on), thereby preserving the container's axis and alignment. The set of mini vehicles 704, as described in FIG. 8 and FIG. 7, although not shown in FIG. 9A, are strategically positioned beneath the container 904B or 904A, typically at key support points aligned with its weight distribution. The set of mini vehicles 704 may be placed as per the coordinates of the container 904B or 904A. During the transfer, the computer system 202 calculates the individual trajectory and movement of the mini vehicles to maintain the container's alignment. This involves precise coordination of their speed, direction, and stopping points.

The container 904B is securely placed on the train 906 with its coordinates (X1, Y1), (X2, Y2), (X3, Y3), (X4, Y4), and (X5, Y5) defining its exact position and orientation. These coordinates are recorded by the computer system 202, forming a reference for the transfer process. The computer system 202 calculates an individual trajectory for each mini vehicle based on the relative positions of the train 906 and the truck 902. Mini vehicles are positioned under the container and begin moving along the calculated path. Upon reaching the truck 902, the container 904B is carefully placed and positioned so that its coordinates match those recorded from its placement on the train 906. For example, the system ensures that the bottom-left corner (X1, Y1) on the train 906 corresponds to the same relative point (X1', Y1') on the truck 902, maintaining the container's original axis and orientation. Sensors and cameras may verify the alignment of the container 904B on the truck by comparing the recorded coordinates (e.g., (X1, Y1) on the train 906) with its position on the truck 902. If discrepancies are detected, the computer system 202 may make real-time adjustments.

This level of precision is particularly useful in scenarios where container alignment is critical, such as intermodal transportation means ensuring that containers transferred between different modes of transport, such as trains and trucks, maintain consistent alignment for efficient handling and stacking. Specialized cargo for containers carrying fragile or sensitive materials, precise alignment minimizes the risk of damage during subsequent handling or transportation. Accurate placement ensures that containers may be seamlessly integrated into automated storage and retrieval systems.

Figure 9B:
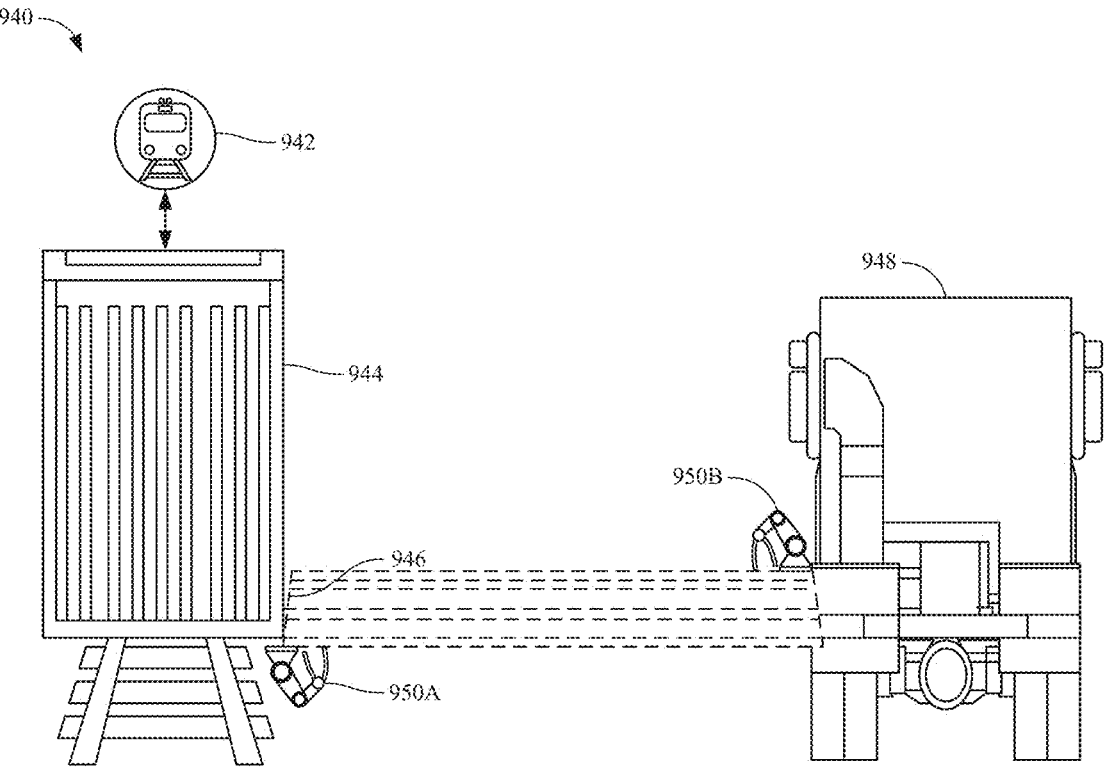
FIG. 9B is a diagram that illustrates an example use case for the automated transfer of containers, in accordance with an embodiment of the disclosure.

FIG. 9B is a diagram that illustrates an example use case for automated transfer of containers, in accordance with an embodiment of the disclosure. FIG. 9B is explained in conjunction with elements from FIG. 1-9A. FIG. 9B illustrates an environment 940 designed to facilitate the transfer of a container 944 from a train 942 (a carrier vehicle) to a truck 948 (or a transportation vehicle) using an electromechanical platform 946. The environment 940 showcases a container transfer system that leverages robotic arms, denoted as 950A and 950B, for precise movement and alignment of the electromechanical platform 946 with the train 942 and the truck 948 during the transfer process. In the environment 940, the train is depicted as carrying a container 944, securely placed on its cargo bed. This container 944 is to be transferred to the truck 948. The truck 948 is positioned adjacent to the train 942 and is shown ready to receive the container 944. The alignment of the truck 948 with the train 942 ensures the efficient transfer of the container 944 via the electromechanical platform 946. The electromechanical platform 946 extends between the train 942 and the truck 948, creating a direct path for the container's movement. This electromechanical platform 946 serves as a dynamic bridge and is equipped with advanced features to support precise container handling and transfer. The robotic arm 950A located at the train end is attached to the electromechanical platform 946 and may facilitate the initial movement of the container 944 from the train 942 onto the electromechanical platform 946.

The computer system 202 ensures that the electromechanical platform 946 is properly aligned with both vehicles, taking into account height differences, angles, and positions. At the train end, the robotic arm 950A may engage with the container 944 and may use clamps, suction devices, or magnetic grips to securely hold the container 944. Once secured, the robotic arm 950A may initiate the movement of the container 944 onto the electromechanical platform 946. The robotic arm 950A may also be used to extend the electromechanical platform 946 from the base instead of sliding rails as explained in FIG. 4A and FIG. 4B.

After the robotic arm 950A helps with the container placement, the movement of the container 944 across the electromechanical platform 946 takes place where the electromechanical platform 946, equipped with motorized rollers, belts, or tracks, facilitates the smooth transfer of the container 944 across its surface. Sensors and controllers ensure that the container 944 remains stable and aligned during this movement. Followed by engagement by the robotic arm 950A where, as the container 944 reaches the truck end of the electromechanical platform 946, the robotic arm 950B takes over. The robotic arm 950B guides the container 944 onto the truck's cargo bed, ensuring precise placement. This operation may involve minor adjustments to the container's position or orientation to align the container 944 with the truck's mounting points. Once the container 944 is securely placed on the truck 948, the robotic arm 950B disengages with the container 944, and the electromechanical platform 946 retracts. The computer system 202 verifies the container's alignment and stability before terminating the transfer process.

Additionally, the electromechanical platform 946 may adjust its height, tilt, and length to accommodate differences in the dimensions or positions of the train and truck. For instance, if the train is on a slightly higher track, the electromechanical platform 946 may incline to compensate the height difference. The robotic arm 950A and the robotic arm 950B are highly versatile and configured for handling containers of various sizes and weights. They may include advanced grippers to adapt to containers with irregular shapes or surfaces. For example, if the container 944 has lifting hooks or slots, the robotic arm 950A and the robotic arm 950B may utilize a suitable latching mechanism to latch with such hooks or slots for secure engagement. In various embodiments, sensors may be deployed to monitor the container's movement. If any deviation or instability is detected, the process may be paused, and corrective measures may be taken. For instance, if the container 944 shifts during movement, the robotic arm 950A/950B may re-engage to stabilize it. Adding on, while the environment 940 illustrates a transfer between a train and a truck, the system may be adapted for various vehicle combinations, such as ship-to-truck or train-to-train transfers. The electromechanical platform 946 and the robotic arm 950A/950B are designed to operate across different environments and vehicle types.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable one of ordinary skill in the art to understand the embodiments disclosed herein.

What is claimed is:

1. A computer-implemented method, comprising:
obtaining, by a computer, first attribute data of a transportation vehicle, second attribute data of a container on a carrier vehicle, first position data of the transportation vehicle, and second position data of the carrier vehicle;

authenticating, by the computer, the transportation vehicle for container transfer of the container, wherein the authenticating the transportation vehicle is based on the first attribute data and the second attribute data;

generating, by the computer, a transfer trajectory between the carrier vehicle and the transportation vehicle, based on the first position data and the second position data, wherein the transfer trajectory is associated with the container;

controlling, by the computer, an electromechanical platform to movably extend in a space between the carrier vehicle and the transportation vehicle to create a transfer path for the container;

identifying, by the computer, a set of mini vehicles from a plurality of mini vehicles, based on the second attribute data of the container; and controlling, by the computer, each mini vehicle of the set of mini vehicles to move the container from the carrier vehicle to the transportation vehicle along the electromechanical platform, based on the transfer trajectory.

2. The computer-implemented method of claim 1, further comprising generating, by the computer, control commands based on the first position data and the second position data, wherein the control commands define maneuvers for at least one of the transportation vehicle or the carrier vehicle to align the transportation vehicle with the container.

3. The computer-implemented method of claim 1, wherein the second attribute data comprises a physical size of the container, and wherein the identifying the set of mini vehicles from the plurality of mini vehicles further comprises:

determining, by the computer, a plurality of attach points on the container based on the physical size of the container; and determining, by the computer, a count of the set of mini vehicles based on a count of the plurality of attach points on the container.

4. The computer-implemented method of claim 3, wherein the controlling each mini vehicle of the set of mini vehicles further comprises:

controlling, by the computer, each mini vehicle of the set of mini vehicles to align with a corresponding attach point of the plurality of attach points on the container;

determining, by the computer, an individual trajectory for each mini vehicle of the set of mini vehicles based on the transfer trajectory and the corresponding attach point of the plurality of attach points on the container; and controlling, by the computer, a motion of each mini vehicle of the set of aligned mini vehicles based on a corresponding individual trajectory.

5. The computer-implemented method of claim 1, wherein the second attribute data comprises a physical weight of the container, and wherein the identifying the set of mini vehicles from the plurality of mini vehicles further comprises:

determining, by the computer, a load carrying capacity of each mini vehicle of the plurality of mini vehicles;

filtering, by the computer, the plurality of mini vehicles based on the load carrying capacity of each mini vehicle of the plurality of mini vehicles and the physical weight of the container; and outputting, by the computer, a plurality of filtered mini vehicles as the set of mini vehicles for the container transfer.

6. The computer-implemented method of claim 1, wherein the controlling each mini vehicle of the set of mini vehicles is based on at least one state parameter of at least one mini vehicle of the set of mini vehicles, and wherein the at least one state parameter is associated with dynamics of the at least one mini vehicle of the set of mini vehicles.

7. The computer-implemented method of claim 6, further comprising:

generating, by the computer, a threshold condition associated with a mobility of the at least one mini vehicle based on at least one physical attribute of the at least one mini vehicle and the second attribute data of the container; and detecting, by the computer, an anomaly associated with the mobility of the at least one mini vehicle based on the at least one state parameter violating the threshold condition.

8. The computer-implemented method of claim 1, further comprising:

generating, by the computer, transfer record data for the container based on movement of the container from the carrier vehicle to the transportation vehicle; and updating, by the computer, a transfer log database based on the transfer record data.

9. The computer-implemented method of claim 1, wherein the first attribute data is associated with at least one of a first physical dimension of the transportation vehicle or a first identifier of the transportation vehicle, and wherein the second attribute data is associated with at least one of a second physical dimension of the container or a second identifier of the container.

10. A computer system, comprising:
a processor set;
one or more computer-readable storage media; and
program instructions stored on the one or more computer-readable storage media, the program instructions executable by the processor set to cause the processor set to:
obtain first attribute data of a transportation vehicle, second attribute data of a container on a carrier vehicle, first position data of the transportation vehicle, and second position data of the carrier vehicle;

authenticate the transportation vehicle for container transfer of the container, wherein the authentication is based on the first attribute data and the second attribute data;

generate a transfer trajectory between the carrier vehicle and the transportation vehicle, based on the first position data and the second position data, wherein the transfer trajectory is associated with the container;

control an electromechanical platform to movably extend in a space between the carrier vehicle and the transportation vehicle to create a transfer path for the container;

identify a set of mini vehicles from a plurality of mini vehicles, based on the second attribute data of the container; and control each mini vehicle of the set of mini vehicles to move the container from the carrier vehicle to the transportation vehicle along the electromechanical platform, based on the transfer trajectory.

11. The computer system of claim 10, wherein the program instructions further cause the processor set to generate control commands based on the first position data and the second position data, wherein the control commands define maneuvers for at least one of the transportation vehicle or the carrier vehicle to align the transportation vehicle with the container.

12. The computer system of claim 10, wherein the second attribute data comprises a physical size of the container, and wherein to identify the set of mini vehicles from the plurality of mini vehicles, the program instructions further cause the processor set to:

determine a plurality of attach points on the container based on the physical size of the container; and determine a count of the set of mini vehicles based on a count of the plurality of attach points on the container.

13. The computer system of claim 12, wherein to control each mini vehicle of the set of mini vehicles, the program instructions further cause the processor set to:

control each mini vehicle of the set of mini vehicles to align with a corresponding attach point of the plurality of attach points on the container;

determine an individual trajectory for each mini vehicle of the set of mini vehicles based on the transfer trajectory and the corresponding attach point of the plurality of attach points on the container; and control a motion of each mini vehicle of the set of aligned mini vehicles based on a corresponding individual trajectory.

14. The computer system of claim 10, wherein the second attribute data comprises a physical weight of the container, and wherein to identify the set of mini vehicles among from the plurality of mini vehicles, the program instructions further cause the processor set to:

determine a load carrying capacity of each mini vehicle of the plurality of mini vehicles;

filter the plurality of mini vehicles, based on the load carrying capacity of each mini vehicle of the plurality of mini vehicles and the physical weight of the container; and output the plurality of filtered mini vehicles as the set of mini vehicles for the container transfer.

15. The computer system of claim 10, wherein the program instructions further cause the processor set to control, each mini vehicle of the set of mini vehicles to move the container along the electromechanical platform, based on at least one state parameter of at least one mini vehicle of the set of mini vehicles, and wherein the at least one state parameter is associated with dynamics of the at least one mini vehicle of the set of mini vehicles.

16. The computer system of claim 15, wherein the program instructions further cause the processor set to:

generate a threshold condition associated with a mobility of the at least one mini vehicle based on at least one physical attribute of the at least one mini vehicle and the second attribute data of the container; and detect an anomaly associated with the mobility of the at least one mini vehicle based on a violation of the threshold condition by the at least one state parameter.

17. The computer system of claim 10, wherein the program instructions further cause the processor set to:

generate transfer record data for the container based on movement of the container from the carrier vehicle to the transportation vehicle; and update a transfer log database based on the transfer record data.

18. The computer system of claim 10, wherein the first attribute data is associated with at least one of a first physical dimension of the transportation vehicle or a first identifier of the transportation vehicle, and wherein the second attribute data is associated with at least one of a second physical dimension of the container or a second identifier of the container.

19. A computer-program product for an automated transfer of a container from a carrier vehicle to a transportation vehicle, the computer-program product comprising:

one or more computer-readable storage media; and program instructions stored on the one or more computer-readable storage media to perform operations comprising:

obtaining first attribute data of the transportation vehicle, second attribute data of the container, first position data of the transportation vehicle, and second position data of the carrier vehicle;

authenticating the transportation vehicle for the automated transfer of the container, wherein the authenticating the transportation vehicle is based on the first attribute data and the second attribute data;

generating a transfer trajectory between the carrier vehicle and the transportation vehicle, based on the first position data and the second position data, wherein the transfer trajectory is associated with the container;

controlling an electromechanical platform to movably extend in a space between the carrier vehicle and the transportation vehicle to create a transfer path for the container;

identifying a set of mini vehicles from a plurality of mini vehicles, based on the second attribute data of the container; and controlling each mini vehicle of the set of mini vehicles to move the container from the carrier vehicle to the transportation vehicle along the electromechanical platform, based on the transfer trajectory.

20. The computer-program product of claim 19, wherein the first attribute data is associated with at least one of a first physical dimension of the transportation vehicle or a first identifier of the transportation vehicle, and wherein the second attribute data is associated with at least one of a second physical dimension of the container or a second identifier of the container.

* * * * *